United States Patent
Iwakiri et al.

(10) Patent No.: US 6,580,525 B1
(45) Date of Patent: Jun. 17, 2003

(54) METHOD OF AND SYSTEM READING OUT IMAGE SIGNAL

(75) Inventors: Naoto Iwakiri, Kaisei-machi (JP); Satoshi Arakawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/533,938

(22) Filed: Mar. 23, 2000

(30) Foreign Application Priority Data

Mar. 23, 1999 (JP) .......................................... 11-078557
Sep. 22, 1999 (JP) .......................................... 11-268313

(51) Int. Cl.⁷ .......................... H04N 1/40; H04N 1/36; H04N 1/04; G06K 15/00; G03B 42/08

(52) U.S. Cl. ....................... 358/471; 358/445; 358/451; 358/448; 358/3.21; 358/486; 358/496; 358/412; 358/409; 358/497; 358/471; 250/584; 250/585; 250/586; 250/587; 250/472.1; 382/132

(58) Field of Search .............................. 358/445, 451, 358/448, 3.21, 486, 496, 412, 409, 497; 250/584, 585, 586, 587, 472.1; 382/132

(56) References Cited

U.S. PATENT DOCUMENTS

| 4,258,264 A | 3/1981 | Kotera et al. ................ 250/484 |
| 4,346,295 A | 8/1982 | Tanaka et al. ............. 250/327.2 |
| 4,485,302 A | 11/1984 | Tanaka et al. ............. 250/327.2 |
| 4,734,783 A | 3/1988 | Horikawa .................... 358/280 |
| 4,750,048 A | * 6/1988 | Satoh et al. ................. 358/528 |
| 4,985,629 A | 1/1991 | Horikawa ................. 250/327.2 |
| 5,051,587 A | * 9/1991 | Hara et al. ................... 250/584 |
| 5,177,626 A | * 1/1993 | Nosaki et al. ............... 358/486 |
| 6,016,356 A | 1/2000 | Ito et al. ...................... 382/132 |

FOREIGN PATENT DOCUMENTS

| EP | 798664 A2 | 10/1997 | ............. G06T/3/40 |
| JP | 55-12429 | 1/1980 | ............. G01T/1/10 |
| JP | 55-87970 | 7/1980 | ............. G01T/1/29 |
| JP | 56-11395 | 2/1981 | ............. G21K/4/00 |
| JP | 56-11397 | 2/1981 | ............. G21K/4/00 |
| JP | 61-189763 | 8/1986 | ............. H04N/1/04 |
| JP | 62-47261 | 2/1987 | ............. H04N/1/04 |
| JP | 64-86759 | 3/1989 | ............. H04N/1/04 |
| JP | 2-58973 | 2/1990 | ............. H04N/1/40 |
| JP | 7-287330 | 10/1995 | ............ G03B/42/02 |
| JP | 8-16767 | 1/1996 | ............. G06T/3/40 |
| JP | 9-50516 | 2/1997 | ............. G06T/3/40 |
| JP | 9-321981 | 12/1997 | .......... H04N/1/393 |

OTHER PUBLICATIONS

Abstract JP 9050516A.
Abstract JP 61189763A Aug. 23, 1986.
Abstract JP 1086795A Mar. 21, 1989.

* cited by examiner

*Primary Examiner*—Edward Coles
*Assistant Examiner*—Jason Sherrill
(74) *Attorney, Agent, or Firm*—Sughrue Mion, PLLC

(57) ABSTRACT

A digital image signal is read out at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from the recording medium upon exposure to the light beam to obtain an analog image signal, sampling the analog image signal at a predetermined intervals, and quantizing the sampled values. A digital image signal at a desired picture element density different from the predetermined picture element density is read out by changing the sub-scanning speed to m(>0) times the predetermined sub-scanning speed, and changing the intervals at which the analog image signal is sampled to intervals n(>0) times the predetermined intervals.

14 Claims, 7 Drawing Sheets

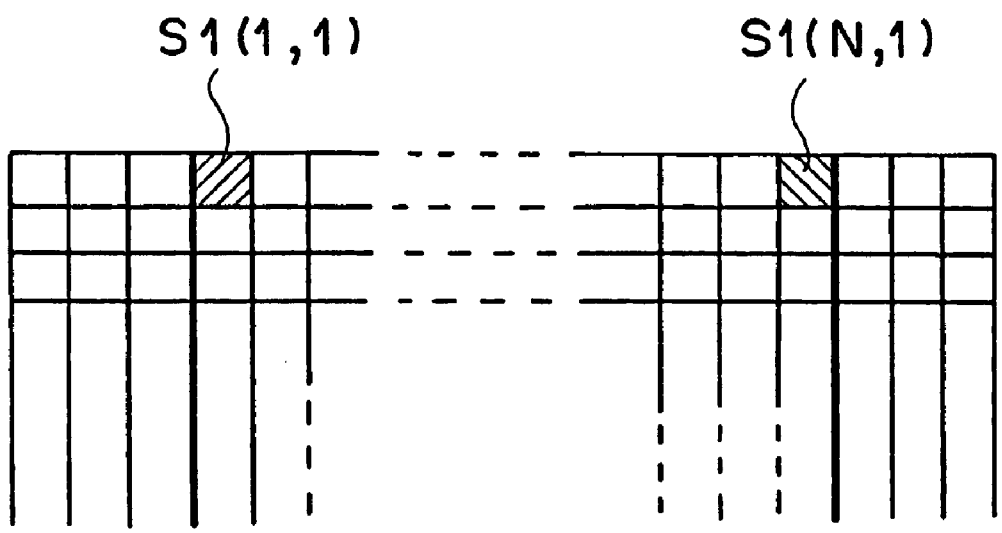
F I G. 8

METHOD OF AND SYSTEM READING OUT IMAGE SIGNAL

BACKGROUND OF THE INVENTION

1. Field of the Invention

This invention relates to a method of and a system for reading out image signal, and more particularly to a method of and a system for reading out image signal in which the density of picture elements of the read-out image signal can be changed.

2. Description of the Related Art

When certain kinds of phosphors are exposed to a radiation such as X-rays, $\alpha$-rays, $\beta$-rays, $\gamma$-rays, cathode rays or ultraviolet rays, they store a part of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a sheet provided with a layer of the stimulable phosphor (will be referred to as "a stimulable phosphor sheet", hereinbelow) is first exposed to a radiation passing through an object such as the human body to have a radiation image of the object stored on the stimulable phosphor sheet, a stimulating light beam such as a laser beam is caused to scan the stimulable phosphor sheet so that the stimulable phosphor sheet emits stimulated emission as signal light bearing thereon information on the radiation image, the stimulated emission is photoelectrically detected, thereby obtaining an analog image signal, the analog image signal is sampled at predetermined intervals and quantized, thereby obtaining a digital image signal at a predetermined picture element density, and the radiation image of the object is reproduced as a visible image on the basis of the digital image signal on a recording medium such as a photographic film or a display such as a CRT. See, for instance, Japanese Unexamined Patent Publication Nos. 55(1980)-12429, 56(1981)-11395 and 56(1981)-11397.

This system is advantageous over a conventional radiography system using silver salt film in that an image can be recorded over a very wide radiation exposure range.

As a system for reading out the stimulated emission, there has been proposed a radiation image read-out system in which a photoelectric read-out means is disposed on each side of the stimulable phosphor sheet, stimulating light is projected onto one side or both sides of the stimulable phosphor sheet and the stimulated emission from both sides of the stimulable phosphor sheet is detected by each of the photoelectric read-out means. See, for instance, Japanese Unexamined Patent Publication No. 55(1980)-87970. In such a radiation image read-out system, since a single radiation image is stored in a stimulable phosphor sheet and a pair of photoelectric read-out means are disposed to detect the stimulated emission from both sides of the stimulable phosphor sheet, light collecting efficiency is improved, and by adding the obtained two image signals at a predetermined ratio of addition, positions in which noise components are detected differ by the sides of the stimulable phosphor sheet and accordingly, an addition signal which is improved in S/N ratio as compared with an image signal obtained from only one side can be obtained.

Further there has been proposed a method of superposing images in which an addition image signal is obtained after carrying out filtering processing, using a filter having frequency response properties such as will increase the S/N ratio of an image signal (including an addition signal), on a single image signal obtained from one side of the stimulable phosphor sheet or two image signals obtained from opposite sides of the same. (Japanese Unexamined Patent Publication No. 7(1995)-287330) In accordance with this method, since the amount of exposure to the radiation to which the object is exposed upon taking the radiation image is obtained and the parameter (the coefficient of filter) which is used for carrying out filtering processing is obtained on the basis of the amount of exposure to the radiation, an image signal representing an image of optimal quality or an addition image signal representing a superposed image of optimal quality can be obtained according to the amount of exposure to the radiation. Further, since processing to change the frequency characteristics is carried out on the overall image signal, it becomes unnecessary to effect frequency transformation such as Fourier transformation and the amount of computation can be reduced.

There has been a demand toward changing the density of picture elements of a single image signal or an addition signal in the image read-out section of the aforesaid radiation image recording and reproducing system or in the radiation image read-out system.

For example, when a large number of radiation images are taken as in a group examination, there is a demand toward increasing the radiation image read-out speed while the quality of the images to be reproduced need not be so high provided that whether reexamination is necessary can be judged. In such a case, the images need not be read out at a high picture element density. Conversely, there is a case where the image should be read out at a high picture element density so that the image can be reproduced at a high quality even if the read-out speed is lowered.

To read out the image at a picture element density other than the preset picture element density may be realized by simply changing the main scanning speed and the sub-scanning speed of the stimulating light beam. The main scanning speed of the stimulating light beam can be changed by changing the driving speed of the scanning optical system for causing the stimulating light beam to scan the stimulable phosphor sheet (e.g., a polygonal mirror or a galvanometer mirror).

However, when the driving speed of the scanning optical system is changed, it takes a certain time for the driving to be stabilized due to inertia of the optical system, and the optical system cannot be constantly stably driven over the entire driving speed range. Accordingly, it is preferred that the picture element density be changed without changing the main scanning speed of the stimulating light beam. Further when the picture element density is to be changed, it is necessary to change the picture element density in the sub-scanning direction in the same proportion as the picture element density in the main scanning direction.

Further when the picture element density is to be changed, it is preferred that the picture element density changing processing be carried out at a speed as high as possible.

Further, when the picture element density is simply changed, there is a possibility that the following problems arise.

That is,

1) When the picture element density is changed, energy of signal light emitted from the stimulable phosphor sheet per one picture element differs from that for the original picture element density. Accordingly, when the difference between the changed picture element density and the original picture element density is large, the density (or brightness) of the overall image to be reproduced can be changed, which can adversely affect diagnostic performance of the image.

2) When shading correction is to be carried out on the analog image signal, properties of shading to be corrected varies before and after the picture element density change and the shading sometimes cannot be properly corrected.

3) When the analog image signal is to be logarithmically amplified, the frequency transfer properties can vary before and after the picture element density change.

4) When filtering for removing aliasing noise is to be carried out prior to sampling the analog image signal, aliasing noise sometimes cannot be properly cut since Nyquist frequency varies before and after the picture element density change.

These problems arise not only when an image signal representing a radiation image is read out from a stimulable phosphor sheet but also, for instance, when a medium on which an image is printed is scanned by a light beam and light reflected from the medium according to the image printed thereon is read out as signal light.

SUMMARY OF THE INVENTION

In view of the foregoing observations and description, the primary object of the present invention is to provide a method of and system for reading out an image signal in which the picture element density can be changed without changing the main scanning speed of the read-out light beam.

Another object of the present invention is to provide a method of and system for reading out an image signal from signal light emitted from both sides of a recording medium in which the picture element density can be changed without changing the main scanning speed of the read-out light beam.

The method of and the system for reading out an image signal in accordance with the present invention are characterized in that a digital image signal having a desired picture element density is obtained without changing the main scanning speed by changing the sub-scanning speed and the sampling intervals.

That is, in accordance with a first aspect of the present invention, there is provided a method of obtaining, in a method of reading out a digital image signal at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from the recording medium upon exposure to the light beam to obtain an analog image signal, sampling the analog image signal at a predetermined intervals, and quantizing the sampled values, a digital image signal at a desired picture element density different from the predetermined picture element density, the method comprising the steps of changing the sub-scanning speed to $m(>0)$ times said predetermined sub-scanning speed, and changing the intervals at which the analog image signal is sampled to intervals $n(>0)$ times said predetermined intervals.

In a preferred embodiment, the method further comprises a step of carrying out, on the digital image signal, picture element density changing processing for changing the number of the picture elements in the main scanning direction to $a/m$ $(a>0)$ times and the number of the picture elements in the sub-scanning direction to $a/n$ times.

In accordance with a second aspect of the present invention, there is provided a method of obtaining, in a method of obtaining an addition image signal at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from both sides of the recording medium upon exposure to the light beam to obtain two analog image signals, sampling the analog image signals at a predetermined intervals, quantizing the sampled values, and adding two digital image signals thus obtained, an addition image signal at a desired picture element density different from the predetermined picture element density, the method comprising the steps of changing the sub-scanning speed to $m(>0)$ times said predetermined sub-scanning speed, and changing the intervals at which the analog image signal is sampled to intervals $n(>0)$ times said predetermined intervals, thereby obtaining two intermediate digital image signals, and carrying out, on the intermediate digital image signals, picture element density changing processing for changing the number of the picture elements in the main scanning direction to aim $(a>0)$ times and the number of the picture elements in the sub-scanning direction to $a/n$ times.

In the methods of the first and second aspects of the present invention, the recording medium may be a stimulable phosphor sheet used in the aforesaid radiation image recording and reproducing system as well as a reflection original such as a photographic print and a transparent original such as a photographic film. Accordingly, the signal light emitted from the recording medium includes stimulated emission emitted from a stimulable phosphor sheet upon exposure to the light beam, reflected light reflected by a reflection original, and transmitted light from a transparent original.

As a method of changing the sampling intervals, a method in which a clock frequency-divided from a reference clock for determining said predetermined sampling timings are made and the analog image signal is sampled on the basis of the frequency-divided clock, a method in which a new clock different from the reference clock in cycles are made by use of a PLL and the analog image signal is sampled on the basis of the new clock, or a method in which a plurality of sampling clocks which are different from each other in cycles are prepared and the analog image signal is sampled on the basis of one of the clocks may be employed.

As a method of obtaining the addition image signal, as well as a method in which the image signal components of the two digital image signals for the corresponding picture elements are added together, a method in which the two digital image signals are added together after they are subjected to filtering processing by use of a filter having frequency response properties such as to increase the S/N ratio of the addition image signal as disclosed, for instance, in Japanese Unexamined Patent Publication No. 7(1995)-287330 may be employed.

The picture element density changing processing may be carried out, for instance, by effecting one-dimensional mask operation in the main scanning direction of the image signal, by thinning picture elements according to the desired picture element density, by high-order interpolation such as B-spline interpolation or cubic spline interpolation (disclosed, for instance, in Japanese Unexamined Patent Publication Nos. 8(1996)-16767 and 9(1997)-321981), or by linear interpolation (disclosed, for instance, in Japanese Unexamined Patent Publication No. 9(1997)-50516).

It is preferred that a parameter for the one-dimensional mask operation, a parameter for thinning the picture elements or a parameter of an operation expression for the interpolation be changed according to the values of m and n. The parameter for the one-dimensional mask operation is a coefficient of mask, and the parameter for thinning the picture elements is the intervals at which the picture elements are thinned. The parameter of the operation expression for the interpolation represents the operation expression to be employed in the interpolation (e.g., B-spline interpolation, Cubic spline interpolation or linear interpolation).

In the method of the second aspect of the present invention, it is preferred that the picture element density changing processing be carried out on said two intermediate digital image signals before they are added together.

Further in the methods of the first and second aspects of the present invention, it is preferred that at least one of the following properties be changed according to the values of said m and n.
(1) The beam diameter of the light beam.
(2) The power of the light beam.
(3) The sensitivity of detecting the signal light.
(4) The preset data for shading correction when shading correction is to be carried out on the analog image signal.
(5) The timing at which the data for shading correction is output from a memory.
(6) The frequency transfer properties when the analog image signal is to be logarithmically amplified.
(7) The cut-off frequency when filtering for removing aliasing noise is carried out prior to sampling the analog image signal.
(8) The parameter for filtering processing in the picture element density changing processing (including the parameter for thinning the picture elements when thinning processing is carried out as the filtering processing).

It is not necessary that all of the items (1) to (8) are changed according to the values of said m and n, but at least one of the items (1) to (8) may be changed. For example, when the shading correction need not be carried out, the items (4) and (5) need not be included.

The items (1) to (3) to be changed according to the values of said m and n are for overcoming the aforesaid problem 1), that is, when the difference between the changed picture element density and the original picture element density is large, the density (or brightness) of the overall image to be reproduced can be changed, which can adversely affect diagnostic performance of the image. Specifically, when the picture element density is increased, (1) the beam diameter of the light beam is reduced, (2) the power of the light beam is weakened, and/or (3) the sensitivity of detecting the signal light is increased. To the contrast, when the picture element density is reduced, (1) the beam diameter of the light beam is enlarged, (2) the power of the light beam is increased, and/or (3) the sensitivity of detecting the signal light is lowered.

Similarly when the picture element density is increased, (6) the frequency transfer properties are widened to a high-frequency band, and (7) the cut-off frequency is shifted toward the high-frequency side. When the picture element density is reduced, (6) the frequency transfer properties are narrowed toward the low-frequency side, and (7) the cut-off frequency is shifted toward the low-frequency side.

The item (8) may be changed, for instance, in the following manner. That is, the parameter for filtering processing (the coefficient of the mask operation) in the picture element density changing processing is changed so that the cut-off frequency for mask operation is shifted toward the low-frequency side as the picture element density is reduced. When the parameter for thinning processing is applied, the parameter is changed so that the cut-off frequency is shifted toward the high-frequency side as the picture element density is reduced.

The item (4) is not shifted qualitatively according to the picture element density. Accordingly, by preparing a plurality of sets of data for shading correction for a plurality of representative picture element densities, and data for shading correction corresponding the desired picture element density is selected from the sets of data, or when there is prepared no data for picture element density equal to the desired picture element density, the data for shading correction corresponding the desired picture element density is obtained by interpolation by use of two sets of data in the prepared sets of data.

The item (5) is applied when shading correction is carried out on the analog image signal in real time, and by outputting prepared data for shading correction at a timing according to the desired picture element density, shading correction is carried out on an obtained analog image signal. Specifically, when the picture element density is increased, the sampling speed is increased and accordingly, the data output timing is advanced according to the sampling speed. To the contrast, when the picture element density is reduced, the sampling speed is lowered and accordingly, the data output timing is retarded according to the sampling speed.

Shading means fluctuation in an analog image signal obtained from a photoelectric read-out means (local reduction in photo-detecting efficiency) due to unevenness in the intensity of the scanning light beam caused by unevenness in reflectance on the reflecting surface of the light deflector for deflecting the scanning light beam (e.g., polygonal mirror, galvanometer mirror or the like), fluctuation in the scanning speed caused by fluctuation in deflecting speed of the deflector, or unevenness in detection caused by unevenness in sensitivity in the main scanning direction of a photoelectric detector disposed to extend in the main scanning direction. Further the data for shading correction means shade properties which are obtained in advance, for instance, by use of a reference recording medium such as a stimulable phosphor sheet which has been uniformly exposed to a radiation. See, for instance, Japanese Unexamined Patent Publication Nos. 61(1986)-189763, 62(1987)-47259, 62(1987)-47261, 64(1989)-86759, and 2(1990)-58973.

As for the items (1) to (3) and (6) to (8) to be changed according to the desired picture element density, a plurality of beam diameters (1), a plurality of beam powers (2), a plurality of sensitivities (3), a plurality of frequency response properties (6), a plurality of frequency response properties different in cut-off frequencies (7), and a plurality of parameters for filtering processing (8) may be prepared by picture element densities and the items may be changed by selecting one of the respective properties according to the desired picture element density.

The data for shading correction (4) may be changed, as well as by the method described above where one of a plurality of sets of data is selected, by obtaining a set of data for shading for the desired picture element density by sampling a single set of data which has been prepared for said predetermined picture element density.

The picture element densities may be divided to a plurality of levels, e.g., high, standard and low, and the values of m and n may be related to the "high picture element density", the "standard picture element density" and the "low picture element density" so that when the values of m and n give a picture element density within the high picture element density, data for shading correction prepared for the high picture element density is selected, when the values of m and n give a picture element density within the standard picture element density, data for shading correction prepared for the standard picture element density is selected, and when the values of m and n give a picture element density within the low picture element density, data for shading correction prepared for the low picture element density is selected.

The data for shading correction may be selected from a plurality of sets of data for shading correction according to the set values of m and n. In this case, it is preferred that the data for shading correction be selected in one of the following manners [I] and [II]. That is;

[I] With a plurality of sets of data for shading correction which have been set by values of m and n stored in a first memory, data for shading correction corresponding to the selected values of m and n is transferred from the first memory to a second memory each time the values of m and n are selected, and the transferred data for shading correction is read out from the second memory as the selected data for shading correction.

[II] With a plurality of sets of data for shading correction which have been set by values of m and n stored in a first memory, all the sets of data for shading correction are transferred from the first memory to a second memory at different addresses by the values of m and n at a desired time such as starting of the system, and data for shading correction corresponding to the selected values of m and n is read out from the address of the second memory corresponding to the selected values of m and n as the selected data for shading correction.

When the method [I] is employed, the second memory may be small in capacity and the hardware may be simple in structure. On the other hand, when the method [II] is employed, the software may be simple in structure and the data for shading correction can be read out from the second memory at a high speed. In accordance with a third aspect of the present invention, there is provided a method of obtaining, in a method of reading out a digital image signal at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from the recording medium upon exposure to the light beam to obtain an analog image signal, sampling the analog image signal at a predetermined intervals, and quantizing the sampled values, a digital image signal at a picture element density 1/m×n times the predetermined picture element density, the method comprising the steps of changing the sub-scanning speed to m(>0) times said predetermined sub-scanning speed, changing the intervals at which the analog image signal is sampled to intervals n(>0) times said predetermined intervals, and changing at least one of the following properties according to the values of said m and n.

(1) The beam diameter of the light beam.
(2) The sensitivity of detecting the signal light.
(3) The preset data for shading correction when shading correction is to be carried out on the analog image signal.
(4) The frequency transfer properties when the analog image signal is to be logarithmically amplified.
(5) The cut-off frequency when filtering for removing aliasing noise is carried out prior to sampling the analog image signal.

In accordance with a fourth aspect of the present invention, there is provided an image signal read-out system for carrying out the method in accordance with the first aspect of the present invention. That is, in accordance with the third aspect of the present invention, there is provided an image signal read-out system for reading out a digital image signal at a predetermined picture element density comprising a main scanning means which causes a light beam to repeatedly scan a recording medium bearing thereon an image in a main scanning direction at a predetermined main scanning speed, a sub-scanning means which moves the recording medium and/or the light beam relatively to each other in a sub-scanning direction substantially perpendicular to the main scanning direction at a predetermined sub-scanning speed, a photoelectric detector means which photoelectrically detects signal light emitted from the recording medium upon exposure to the light beam to obtain an analog image signal, and an A/D convertor means which samples the analog image signal at a predetermined intervals and quantizes the sampled values, thereby obtaining a digital image signal at a predetermined picture element density, wherein the improvement comprises a sub-scanning speed changing means which causes the sub-scanning means to move the recording medium and/or the light beam relatively to each other in the sub-scanning direction at a speed m(>0) times said predetermined sub-scanning speed, and a sampling interval changing means which causes the A/D convertor means to sample the analog image signal at intervals n(>0) times said predetermined intervals.

It is preferred that the image signal read-out system be further provided with a picture element density changing processing means which carries out, on the digital image signal output from the A/D convertor means, picture element density changing processing for changing the number of the picture elements in the main scanning direction to a/m (a>0) times and the number of the picture elements in the sub-scanning direction to a/n times.

In accordance with a fifth aspect of the present invention, there is provided an image signal read-out system for carrying out the method in accordance with the second aspect of the present invention. That is, in accordance with the fourth aspect of the present invention, there is provided an image signal read-out system for obtaining an addition image signal at a predetermined picture element density comprising a main scanning means which causes a light beam to repeatedly scan a recording medium bearing thereon an image in a main scanning direction at a predetermined main scanning speed, a sub-scanning means which moves the recording medium and/or the light beam relatively to each other in a sub-scanning direction substantially perpendicular to the main scanning direction at a predetermined sub-scanning speed, a photoelectric detector means which photoelectrically detects signal light emitted from both sides of the recording medium upon exposure to the light beam to obtain a pair of analog image signals, an A/D convertor means which samples the analog image signals at a predetermined intervals and quantizes the sampled values, thereby obtaining a pair of digital image signals, and an adder means which adds together the digital image signal and obtains an addition image signal at a predetermined picture element density, wherein the improvement comprises a sub-scanning speed changing means which causes the sub-scanning means to move the recording medium and/or the light beam relatively to each other in the sub-scanning direction at a speed m(>0) times said predetermined sub-scanning speed, a sampling interval changing means which causes the A/D convertor means to sample the analog image signal at intervals n(>0) times said predetermined intervals, and picture element density changing processing means which carries out, on the digital image signals output from the A/D convertor means, picture element density changing processing for changing the number of the picture elements in the main scanning direction to a/m (a>0) times and the number of the picture elements in the sub-scanning direction to a/n times.

In the system of the fifth aspect of the present invention, it is preferred that the picture element density changing processing means carries out said picture element density changing processing on said two digital image signals before they are added together.

Further preferably the systems of the fourth and fifth aspects of the present invention are provided with a characteristic changing means which changes at least one of the following properties according to the values of said m and n.

(1) The beam diameter of the light beam.
(2) The power of the light beam.
(3) The sensitivity of detecting the signal light.
(4) The preset data for shading correction when shading correction is to be carried out on the analog image signal.
(5) The timing at which the data for shading correction is output from a memory.
(6) The frequency transfer properties when the analog image signal is to be logarithmically amplified.
(7) The cut-off frequency when filtering for removing aliasing noise is carried out prior to sampling the analog image signal.
(8) The parameter for filtering processing in the picture element density changing processing (including the parameter for thinning the picture elements when thinning processing is carried out as the filtering processing).

The sub-scanning speed changing means and the sampling interval changing means may form a part of the characteristic changing means.

When the characteristic changing means includes a means for changing the data for shading correction, the data for shading correction may be selected from a plurality of sets of data for shading correction according to the set values of m and n. In this case, it is preferred that the data for shading correction be selected in one of the following manners [I] and [II]. That is;

[I] With a plurality of sets of data for shading correction which have been set by values of m and n stored in a first memory, data for shading correction corresponding to the selected values of m and n is transferred from the first memory to a second memory each time the values of m and n are selected, and the transferred data for shading correction is read out from the second memory as the selected data for shading correction.

[II] With a plurality of sets of data for shading correction which have been set by values of m and n stored in a first memory, all the sets of data for shading correction are transferred from the first memory to a second memory at different addresses by the values of m and n at a desired time such as starting of the system, and data for shading correction corresponding to the selected values of m and n is read out from the address of the second memory corresponding to the selected values of m and n as the selected data for shading correction.

When the method [I] is employed, the second memory may be small in capacity and the hardware may be simple in structure. On the other hand, when the method [II] is employed, the software may be simple in structure and the data for shading correction can be read out from the second memory at a high speed.

In accordance with a sixth aspect of the present invention, there is provided an image signal read-out system for reading out a digital image signal at a predetermined picture element density comprising a main scanning means which causes a light beam to repeatedly scan a recording medium bearing thereon an image in a main scanning direction at a predetermined main scanning speed, a sub-scanning means which moves the recording medium and/or the light beam relatively to each other in a sub-scanning direction substantially perpendicular to the main scanning direction at a predetermined sub-scanning speed, a photoelectric detector means which photoelectrically detects signal light emitted from the recording medium upon exposure to the light beam to obtain an analog image signal, and an A/D convertor means which samples the analog image signal at a predetermined intervals and quantizes the sampled values, thereby obtaining a digital image signal at a predetermined picture element density, wherein the improvement comprises picture element density input means which receives values of m (m>0) and n (n>0) which respectively represent that the picture element density in the main scanning direction is to be changed to 1/m times that of the predetermined picture element density and that the picture element density in the sub-scanning direction is to be changed to 1/n times that of the predetermined picture element density, a sub-scanning speed changing means which causes the sub-scanning means to move the recording medium and/or the light beam relatively to each other in the sub-scanning direction at a speed m(>0) times said predetermined sub-scanning speed, a sampling interval changing means which causes the A/D convertor means to sample the analog image signal at intervals n(>0) times said predetermined intervals, and a characteristic changing means which changes at least one of the following properties according to the values of said m and n.

(1) The beam diameter of the light beam.
(2) The sensitivity of detecting the signal light.
(3) The preset data for shading correction when shading correction is to be carried out on the analog image signal.
(4) The frequency transfer properties when the analog image signal is to be logarithmically amplified.
(5) The cut-off frequency when filtering for removing aliasing noise is carried out prior to sampling the analog image signal.

In the methods and the systems in accordance with the present invention, by changing the sub-scanning speed to m times (m>0) the predetermined sub-scanning speed, the number of the scanning lines of the light beam is changed to 1/m times, whereby the picture element density in the sub-scanning direction is changed to 1/m times. Further by changing the sampling intervals to n times (n>0) the predetermined sampling intervals, the picture element density in the main scanning direction is changed to 1/n times. Accordingly, the picture element density of the image signal finally obtained (the addition image signal in the case where signal light emitted from both sides of the recording medium upon exposure to the light beam is photoelectrically detected and an addition image signal is obtained by adding two digital image signals) is $a/(m \times n)^2$ times said predetermined picture element density. Further since the picture element density can be changed without changing the main scanning speed, it is not necessary to change the driving speed of the scanning optical system for scanning the light beam (e.g., a polygonal mirror or a galvanometer mirror), whereby generation of a dead time (a time which corresponds to the time necessary for the driving speed of the optical system to be stabilized and for which read-out of an image signal is impossible) can be avoided.

Further when picture element density changing processing for changing the number of the picture elements in the main scanning direction to a/m (a>0) times and the number of the picture elements in the sub-scanning direction to a/n times is carried out, the picture element densities in the main scanning direction and the sub-scanning direction of the image signal finally obtained (the addition image signal in the case where signal light emitted from both sides of the recording medium upon exposure to the light beam is photoelectrically detected and an addition image signal is obtained by adding two digital image signals) are both changed to a/(m×n) times, whereby the picture element densities in the sub-scanning direction and in the main scanning direction can be changed in the same proportion and an image signal at a picture element density of $\{a/(m \times n)\}^2$ times the predetermined picture element density can be obtained with the aspect ratio of the image kept unchanged and without changing the main scanning speed.

Especially in the case where signal light emitted from both sides of the recording medium is to be detected (will be referred to as "the both-side reading", hereinbelow) as in the method of the second aspect of the present invention or the system of the fifth aspect of the present invention, it is necessary to slow the scanning speed as compared with the case where signal light from one side of the recording medium is to be detected in order to give energy of the light beam sufficiently to the back side of the recording medium. However even in the case of the both-side reading, the scanning time can be shortened by increasing the sub-scanning speed so long as the picture element density can be lowered.

Further, in the case of the both-side reading, by carrying out the picture element density changing processing on the two digital image signals and obtaining the addition signal by adding the processed image signals, the amount of operation to be performed when the digital image signals are added can be reduced, whereby the time required to add the digital image signals can be shortened and the processing can be carried out in a shorter time.

Further, in accordance with the present invention, various problems which arise when the reading picture element density is changed can be overcome.

That is, the aforesaid problem 1), that when the picture element density is changed, energy of signal light emitted from the stimulable phosphor sheet per one picture element differs from that for the original picture element density, and, when the difference between the changed picture element density and the original picture element density is large, the density (or brightness) of the overall image to be reproduced can be changed to adversely affect diagnostic performance of the image, can be overcome by changing (1) the beam diameter of the light beam according to the picture element density so that the amount of energy to be applied to a unit area of the recording medium is kept unchanged, or by changing (2) the power of the light beam according to the picture element density so that the amount of energy to be applied to a unit area of the recording medium is kept unchanged, or by changing (3) the sensitivity of detecting the signal light according to the picture element density so that the level of the image signal is kept unchanged.

Further the aforesaid problem 2), that when shading correction is to be carried out on the analog image signal, properties of shading to be corrected varies before and after the picture element density change and the shading sometimes cannot be properly corrected, can be overcome by changing (4) the preset data for shading correction according to the picture element density so that shading correction can be carried out following change in shading properties or by changing (5) the timing at which the data for shading correction is output from a memory so that shading correction can be carried out following change in the sampling speed.

The aforesaid problem 3), that when the analog image signal is to be logarithmically amplified, the frequency transfer properties can vary before and after the picture element density change, can be overcome by changing (6) the frequency transfer properties when the analog image signal is logarithmically amplified according to the picture element density so that the frequency transfer properties of the digital image signal obtained is kept unchanged.

The aforesaid problem 4), that when filtering for removing aliasing noise is to be carried out prior to sampling the analog image signal, aliasing noise sometimes cannot be properly cut since Nyquist frequency varies before and after the picture element density change, can be overcome by changing (7) the cut-off frequency of filtering according to the picture element density so that the frequency properties of the digital image signal obtained is kept unchanged.

Further, by changing (8) the parameter for filtering processing (the coefficient of the mask operation) in the picture element density changing processing, the aliasing noise upon picture element density change can be suppressed lower than a certain level and at the same time, error generated by interpolation processing such as spline interpolation operation can be suppressed.

BRIEF DESCRIPTION OF THE DRAWINGS

FIG. 8 is a view for illustrating the filtering processing.

DESCRIPTION OF THE PREFERRED EMBODIMENTS

Figure 1:
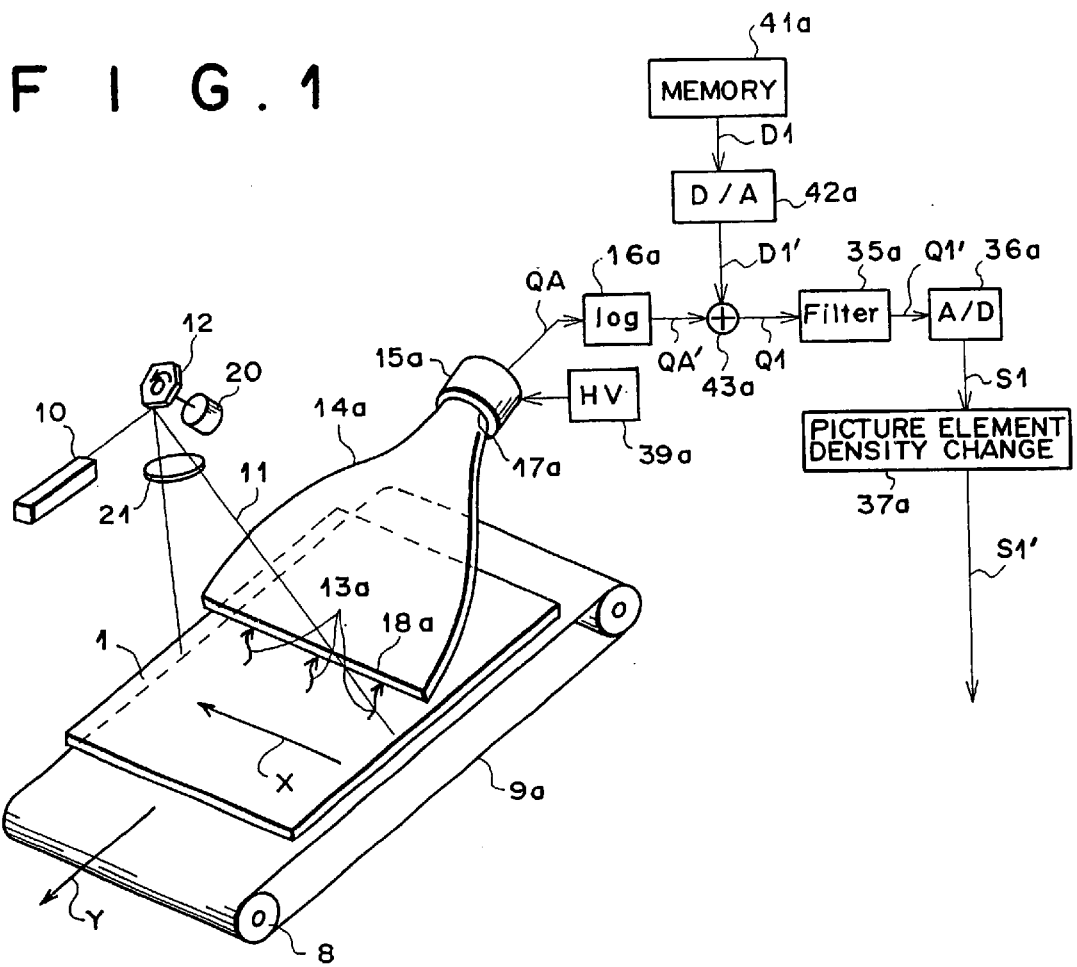
FIG. 1 is a schematic view showing an image signal read-out system in accordance with a first embodiment of the present invention.

In FIG. 1, an image signal read-out system in accordance with a first embodiment of the present invention comprises an endless belt 9a which is driven by an electric motor 8 with a stimulable phosphor sheet 1 storing thereon a radiation image placed thereon. There are disposed above the stimulable phosphor sheet 1 a laser 10 emitting a laser beam 11 which stimulates the stimulable phosphor sheet 1, a rotary polygonal mirror 12 which is rotated by an electric motor 20 to deflect the laser beam 11 at a speed corresponding to a main scanning frequency of 160 Hz, and a scanning lens 21 which converges the laser beam 11 deflected by the polygonal mirror 12 onto the surface of the stimulable phosphor sheet 1 and causes the laser beam 11 to scan the surface of the stimulable phosphor sheet 1 at a constant speed (main scanning).

Just above the stimulable phosphor sheet 1, there is disposed close to the stimulable phosphor sheet 1 a light guide 14a which collects stimulated emission 13a which is emitted from the upper surface of the stimulable phosphor sheet 1 in proportion to the stored energy of radiation upon stimulation by the laser beam 11. A photomultiplier 15a is connected to the light guide 14a to photoelectrically detect the stimulated emission 13a collected by the light guide 14a and convert it to an analog image signal QA. The photomultiplier 15a detects the stimulated emission 13a at a sensitivity which is determined by an electric voltage applied to the photomultiplier 15a by an electric voltage application means 39a.

A logarithmic amplifier 16a is connected to the photomultiplier 15a to logarithmically amplify the analog image signal QA detected by the photomultiplier 15a according to predetermined frequency characteristic and to output a logarithmic image signal QA'.

A memory 41a stores data Di for shading correction according to sampling intervals which have been set in advance and a D/A convertor 42a is connected to the memory 41a. The D/A convertor 42a converts the data D1 for shading correction to an analog signal D1 under the control of a reference clock. To the D/A convertor 42a is connected an adder 43a which adds the analog signal D1' for correction to the logarithmic image signal QA' and outputs a shading-corrected image signal Q1.

Further to the adder 43a is connected an anti-aliasing filter 35a which removes aliasing noise (folded noise) generated by A/D conversion to be described later, and an A/D convertor 36a is connected to the anti-aliasing filter 35a to convert the filtered image signal Q1' to a digital image signal S1 under the control of a reference clock which has been set in advance. The anti-aliasing filter 35a comprises a high-density filter and a low-density filter, and the high-density filter is initially selected and is switched to the low-density filter as required by an input signal from a characteristic changing means 60 to be described later.

A picture element density changing means 37a which changes the picture element density of the digital signal S1, thereby obtaining an image signal S1' is connected to the A/D converter 36a.

Figure 3:
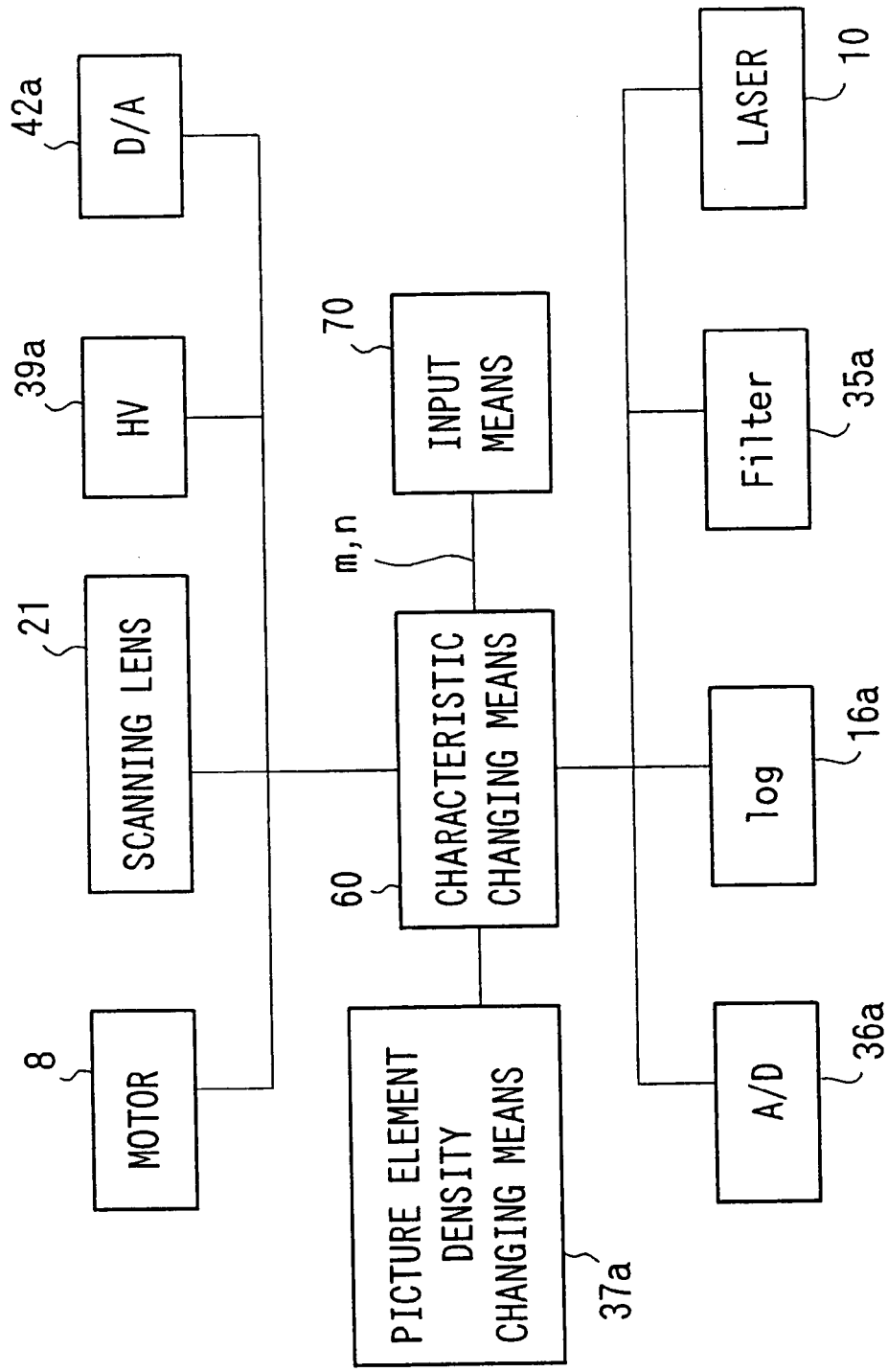
FIG. 3 is a view showing the structure of the characteristic changing means in the image signal read-out system shown in FIG. 1.

As shown in FIG. 3, the image signal read-out system of this embodiment is further provided with an input means 70 which outputs values of parameters (m, n) as m=n=1 when the operator selects "high picture element density" out of "high picture element density" (10 pix/mm) and "low picture element density" (5 pix/mm) and outputs values of the parameters (m, n) as m=n=2 when the operator selects "low picture element density". The image signal read-out system of this embodiment is further provided with a characteristic changing means 60 which, according to the values of the parameters (m, n) input from the input means 70, changes the rotating speed of the electric motor 8 which drives the endless belt 9a, changes the beam diameter of the laser beam 11 on the stimulable phosphor sheet 1 by shifting the scanning lens 21 in the direction of its optical axis, changes the sensitivity of the photomultiplier 15a by controlling the electric voltage application means 39a, changes the data for shading correction output from the memory 41a by changing the sampling clock of the D/A convertor 42a, changes the sampling clock of the A/D convertor 36a, changes the frequency characteristics of the logarithmic amplifier 16a, switches the high-density filter and the low-density filter of the anti-aliasing filter 35a, changes parameters for changing the picture element density in the picture element density changing means 37a.

The picture element density changing means 37a carries out according to the values of parameters (m, n) picture element density changing processing to multiply the picture element density of the digital image signal S1 by 1/m in the main scanning direction and by 1/n in the sub-scanning direction, thereby obtaining an image signal S1' whose picture element density is $1/(m \times n)^2$ times that for values of the parameters of m=n=1. Specifically, the picture element density changing processing may be carried out, for instance, by effecting one-dimensional mask operation in both the main scanning direction and the sub-scanning direction of the digital image signal S1, by thinning picture elements according to the desired picture element density, by high-order interpolation operation such as B-spline interpolation or cubic spline interpolation (disclosed, for instance, in Japanese Unexamined Patent Publication Nos. 8(1996)-16767 and 9(1997)-321981), or by linear interpolation (disclosed, for instance, in Japanese Unexamined Patent Publication No. 9(1997)-50516). At this time, the parameter of the picture element density changing is changed according to the values of the parameters (m, n). The parameter for the one-dimensional mask operation is a coefficient of mask, and the parameter for thinning the picture elements is the intervals at which the picture elements are thinned. When interpolation operation is employed, the kind of the interpolation operation to be carried out on the digital image signal S1 is changed.

Operation of the radiation image signal read-out system of this embodiment will be described, hereinbelow.

A signal representing "high picture element density" (an initialization of the system) selected by the operator is input into the input means 70. Then the input means 70 outputs values of the parameters (m, n) corresponding to "high picture element density", that is, (m, n)=(1, 1), to the characteristic changing means 60.

The characteristic changing means 60 sets upon receipt of the values of the parameters, (m, n)=(1, 1), the rotating speed of the electric motor 8 for driving the endless belt 9a, the position of the scanning lens 21, the control signal to the electric voltage application means 39a, the sampling clock of the D/A convertor 42a, the sampling clock of the A/D convertor 36a, the frequency characteristic of the logarithmic amplifier 16a, the anti-aliasing filter 35a and the picture element density changing means 37a to initial state, which correspond to "high picture element density".

The endless belt 9a is moved in the direction of arrow Y (FIG. 1) at a speed for "high picture element density" with a stimulable phosphor sheet 1 set in a predetermined position on the endless belt 9a, whereby the stimulable phosphor sheet 1 is conveyed in the direction of arrow Y (FIG. 1) at the speed for "high picture element density" (sub-scanning).

The laser beam 11 emitted from the laser 10 is deflected by the rotary polygonal mirror 12 rotated by the electric motor 20 at a high speed in the direction of the arrow, and the deflected laser beam 11 is converged on the surface of the stimulable phosphor sheet 1 conveyed by the endless belt 9a and caused to scan the stimulable phosphor sheet 1 at a constant speed in the direction of arrow X (main scanning) through the scanning lens 21.

The parts of the stimulable phosphor sheet 1 exposed to the laser beam 11 emit stimulated emission 13a in proportion to the radiation energy stored thereon, and the stimulated emission 13a enters the light guide 14a through the light inlet end face 18a of the light guide 14a and is guided the inside of the light guide 14a through total reflection to the photomultiplier 15a. A laser beam cut filter 17a is provided on the junction of the light guide 14a and the photomultiplier 15a to prevent the laser beam 11 entering the light guide 14a from impinging upon the photomultiplier 15a while permit the stimulated emission 13a to impinge upon the same. With this arrangement, the laser beam 11 which is scattered at, for instance, the surface of the stimulable phosphor sheet 1 and enters the light guide 14a is prevented from impinging upon the photomultiplier 15a.

The photomultiplier 15a has been applied with a high voltage, which gives a sensitivity corresponding to "high picture element density", by the electric voltage application means 39a, detects the stimulated emission 13a at the sensitivity for "high picture element density", and converts the stimulated emission 13a to an analog image signal QA. The analog image signal QA output from the photomultiplier 15a is input into the logarithmic amplifier 16a. The analog image signal QA is converted by the logarithmic amplifier 16a, which has been set to have a frequency characteristic for "high picture element density", to a logarithmic image signal QA'. The logarithmic image signal QA' output from the logarithmic amplifier 16a is input into the adder 43a.

The data D1 for shading correction for "high picture element density" stored in the memory 41a is converted to an analog signal D1' by the D/A convertor 42a at a sampling rate governed by the reference clock, which is a clock for "high picture element density".

Figure 2:
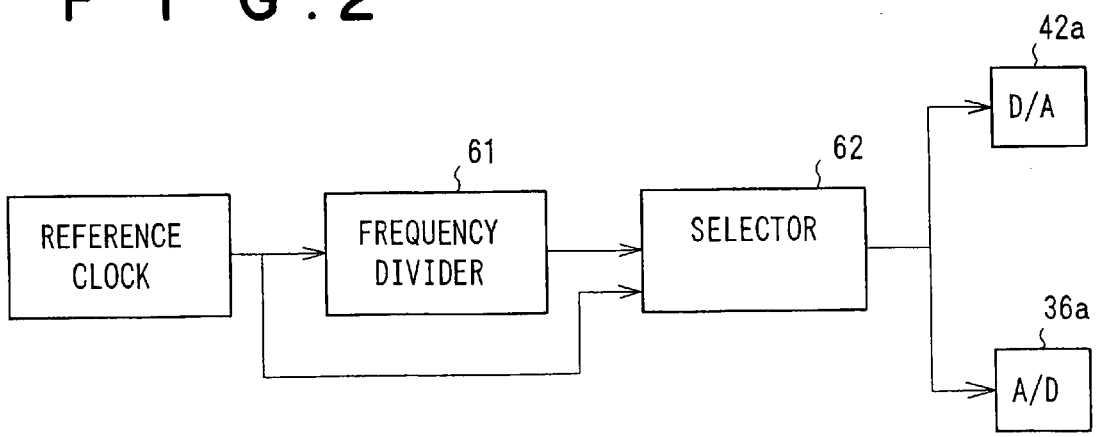
FIG. 2 is a view showing an example of a structure for changing the clock pulses.

The clock input into the D/A convertor 42a here is the reference clock which is selectively output to the D/A convertor 42a and the A/D convertor 36a by a selector 62 provided in the characteristic changing means 60 as shown in FIG. 2.

The analog signal D1' for shading correction is input into the adder 43a and added to the logarithmic image signal QA' input from the logarithmic amplifier 16a, whereby the logarithmic image signal QA' is converted to a shading-corrected image signal Q1. The shading-corrected image signal Q1 is input into the anti-aliasing filter 35a.

The anti-aliasing filter 35a has been switched to the high-density filter by the characteristic changing means 60 and the image signal Q1 input into the anti-aliasing filter 35a is properly removed with aliasing noise by the high-density filter. The image signal Q1' removed with aliasing noise is input into the A/D converter 36a. The A/D converter 36a converts the image signal Q1' to a digital image signal S1 at a sampling rate governed by the reference clock, which is input into the A/D converter 36a at this time by the selector 62 of the characteristic changing means 60. The digital image signal S1 is output to the picture element density changing means 37a.

The picture element density changing means 37a carries out picture element density changing processing to multiply the picture element density of the digital image signal S1 by 1/m in the main scanning direction and by 1/n in the sub-scanning direction. However, since m=n=1 here, the image signal S1' is obtained without carrying out picture element density changing processing, and the image signal S1' is output, for instance, to an image processing system.

Operation of the radiation image signal read-out system of this embodiment when the operator selects "low picture element density" will be described hereinbelow.

When a signal representing "low picture element density" is input into the input means 70 by the operator, the input means 70 outputs values of the parameters (m, n) corresponding to "low picture element density", that is, (m, n)=(2, 2), to the characteristic changing means 60.

The characteristic changing means 60 sets upon receipt of the values of the parameters, (m, n)=(2, 2), the rotating speed of the electric motor 8 for driving the endless belt 9a, the position of the scanning lens 21, the control signal to the electric voltage application means 39a, the sampling clock of the D/A convertor 42a, the sampling clock of the A/D convertor 36a, the frequency characteristic of the logarithmic amplifier 16a, the anti-aliasing filter 35a and the parameter of the picture element density changing means 37a to those which correspond to "low picture element density". Specifically, the characteristic changing means 60 doubles the rotating speed of the motor 8, shifts the scanning lens 21 to a position where the beam diameter of the laser beam 11 on the surface of the stimulable phosphor sheet 1 is substantially doubled, changes the control signal to the electric voltage application means 39a to that which lowers the sensitivity of the photomultiplier 15a, switches the selector 62 (FIG. 2) so that the clock output from a frequency divider 61 (clock which is obtained by frequency-dividing the reference clock and is twice the reference clock in cycles) is selectively input into the D/A convertor 42a and the A/D converter 36a, changes the frequency characteristic of the logarithmic amplifier 16a to that for "low picture element density", switches the anti-aliasing filter 35a to the low-density filter and changes the parameter of the picture element density changing means 37a.

With this condition, an image signal is read out in the same manner as in the "high picture element density read-out". That is, the endless belt 9a is moved in the direction of arrow Y at double the speed for "high picture element density" with a stimulable phosphor sheet 1 set in a predetermined position on the endless belt 9a, whereby the stimulable phosphor sheet 1 is conveyed in the direction of arrow Y at double the speed for "high picture element density" (sub-scanning).

The laser beam 11 emitted from the laser 10 is deflected by the rotary polygonal mirror 12 rotated by the electric motor 20 at the same speed as for "high picture element density", and the deflected laser beam 11 is converged on the surface of the stimulable phosphor sheet 1 conveyed by the endless belt 9a and caused to scan the stimulable phosphor sheet 1 at a constant speed in the direction of arrow X (main scanning) by the scanning lens 21. At this time, the diameter of the laser beam 11 converged on the surface of the stimulable phosphor sheet 1 is double the beam diameter in the "high picture element density read-out".

The parts of the stimulable phosphor sheet 1 exposed to the laser beam 11 emit stimulated emission 13a in proportion to the radiation energy stored thereon, and the stimulated emission 13a is guided to the photomultiplier 15a.

The photomultiplier 15a has been applied with a voltage, which gives a sensitivity lower than that for "high picture element density", by the electric voltage application means 39a, detects the stimulated emission 13a at the sensitivity for "low picture element density", and converts the stimulated emission 13a to an analog image signal QA. The analog image signal QA output from the photomultiplier 15a is input into the logarithmic amplifier 16a. The analog image signal QA is converted by the logarithmic amplifier 16a, which has been set to have a frequency characteristic for "low picture element density", to a logarithmic image signal QA'. The logarithmic image signal QA' output from the logarithmic amplifier 16a is input into the adder 43a.

The data D1 for shading correction for "high picture element density" stored in the memory 41a is converted to an analog signal D1' by the D/A convertor 42a at a sampling rate governed by a clock for "low picture element density" which is half the reference clock in frequency. That is, a frequency divider 61 provided in the characteristic changing means 60 divides the frequency of the reference clock and generates a clock for "low picture element density" which is double the reference clock in cycle. The selector 62 has been switched to selectively input the clock for "low picture element density" output from the frequency divider 61 into the D/A convertor 42a and the A/D convertor 36a. As a result, the analog signal D1' for "low picture element density" is half the analog signal D1' for "high picture element density" in the number of picture elements in the main scanning direction.

The analog signal D1' for shading correction is input into the adder 43a and added to the logarithmic image signal QA' input from the logarithmic amplifier 16a, whereby the logarithmic image signal QA' is converted to a shading-corrected image signal Q1. The shading-corrected image signal Q1 is input into the anti-aliasing filter 35a.

The anti-aliasing filter 35a has been switched to the low-density filter by the characteristic changing means 60 and the image signal Q1 input into the anti-aliasing filter 35a is properly removed with aliasing noise by the low-density filter. The image signal Q1' removed with aliasing noise is input into the A/D converter 36a. The A/D converter 36a converts the image signal Q1' to a digital image signal S1 at a sampling rate governed by the clock for "low picture element density", which is input into the A/D converter 36a at this time by the selector 62 of the characteristic changing means 60.

The picture element density changing means 37a carries out picture element density changing processing for changing the picture element density to 1/m times in the main scanning direction of the digital image signal S1 and to 1/n times in the sub-scanning direction of the same. Since m=n=2 here, the picture element density of the digital image signal S1 is reduced to ½ in both the main scanning direction and the sub-scanning direction. One-dimensional mask operation will be described hereinbelow as an example of the picture element density changing processing. An example of a one-dimensional filter used in the one-dimensional mask operation is as follows.

$$a(x,1)=(-8/105,-5/105,34/105, 63/105,34/105,-5/105,-8/105)$$

Using the one-dimensional filter $a(x, 1)$, filtering processing is carried out at intervals of one picture element in the main scanning direction of the digital image signal S1, and then filtering processing is carried out at intervals of one picture element in the sub-scanning direction of the digital image signal S1. That is, when the values of picture elements of the digital image signal S1 are represented by S1(x, y) and the values of picture elements obtained by picture element density changing processing in the main scanning direction are represented by S1A(x/2, y), the values of picture elements S1A(x/2, y) are calculated according to the following formula (1)

$$S1A(k/2,l)=a(1,1)*S1(k-3,l)+a(2,1)*S1(k-2,l)+a(3,1)*S1(k-1,l)+a(4,1)*S1(k,l)+a(5,1)*S1(k+1,l)+a(6,1)*S1(k+2,l)+a(7,1)*S1(k+3,l) \quad (1)$$

wherein k=1 to N (N being the number or position of the picture element as numbered in the main scanning direction) and l=1 to M (M being the number or position of the picture element as numbered in the sub-scanning direction). Operation according to formula (1) is carried out also in the sub-scanning direction, whereby an image signal S1' changed with picture element density is obtained.

In such mask operation using a one-dimensional filter, data for mask operation becomes short at an edge of the digital image signal S1. In such a case, imaginary picture elements are set on the outer side of the picture element, and the imaginary picture elements are given proper values. Then the filtering processing is carried out by use of the imaginary picture elements.

The picture element density changing processing in the picture element density changing means 37a may be carried out by picture element thinning processing or interpolation operation without limited to mask operation. As the interpolation operation, high-order interpolation operation such as B-spline interpolation operation where weight is given to smoothness or Cubic spline interpolation operation where weight is given to sharpness may be applied as well as linear interpolation.

The picture element density of the image signal S1' obtained by the picture element density changing means 37a when "low picture element density" is selected becomes ¹⁄₁₆ of that when "high picture element density" is selected. The image signal S1' is output, for instance, to an image processing system.

As can be understood from the description above, in the radiation image signal read-out system of this embodiment, a low picture element density image signal whose picture element density is ½ of that of the high picture element density in both the main scanning direction and the sub-scanning direction and is ¼ of that of the high picture element density in total is obtained without changing the main scanning speed of the laser beam 11 and an image signal whose picture element density is ¹⁄₁₆ of that of the high picture element density is obtained by carrying out picture element density changing processing, which reduces the picture element density to ½ in both the main scanning direction and the sub-scanning direction. At the same time, since the characteristic changing means 60 changes, according to the parameters which determine the picture element density, the position of the scanning lens 21, the control signal to the electric voltage application means 39a, the sampling clock for the D/A convertor 42a, the frequency characteristic of the logarithmic amplifier 16a, the anti-aliasing filter 35a and the parameter of the picture element density changing means 37a, a low picture element density image signal can be read out with the amount of energy applied to the stimulable phosphor sheet per one picture element, the sensitivity of the photomultiplier, the shading correction and suppression of aliasing noise set properly according to the read-out picture element density.

Though, in the embodiment described above, the system is set for the high picture element density reading in the initial state, the system may be arranged to be initially set for the standard picture element density reading and to be switched for the high picture element density reading and the low picture element density reading.

When the picture element density in the standard picture element density reading is 10 pix/mm and the main scanning speed (main scanning frequency) is 160 Hz, the sampling intervals in the main scanning direction, the pitches of picture elements in the sub-scanning direction, the sub-scanning speed and the cut-off frequency of the anti-aliasing filter may be, for instance, as follows.

sampling intervals in the main scanning direction: 100 $\mu$m pitches of picture elements in the sub-scanning direction: 100 $\mu$m sampling cycles in the main scanning direction: 1.0 $\mu$sec sub-scanning speed: 16 mm/sec cut-off frequency of the anti-aliasing filter: 500 kHz (Since being an analog filter, the cut-off frequency is preferably not higher than 500 kHz, e.g., 400 kHz)

In the case of high picture element density reading where the picture element density is 20 pix/mm, these factors are changed to as follows with the main scanning speed kept unchanged at 160 Hz.

sampling intervals in the main scanning direction: 50 $\mu$m pitches of picture elements in the sub-scanning direction: 50 $\mu$m sampling cycles in the main scanning direction: 0.5 $\mu$sec sub-scanning speed: 8 mm/sec cut-off frequency of the anti-aliasing filter: 1000 kHz In the case of low picture element density reading where the picture element density is 5 pix/mm, these factors are changed to as follows with the main scanning speed kept unchanged at 160 Hz.

sampling intervals in the main scanning direction: 200 $\mu$m pitches of picture elements in the sub-scanning direction: 200 $\mu$m sampling cycles in the main scanning direction: 2.0 $\mu$sec sub-scanning speed: 32 mm/sec cut-off frequency of the anti-aliasing filter: 250 kHz Though, in the first embodiment, the read-out picture element density is set stepwise like "high picture element density" and "low picture element density", the system may be arranged so that the read-out picture element density can be freely set by selecting the parameters (m, n) which determine the read-out picture element density.

The method of changing the data for shading correction stored in the memory 41a will be described in detail with reference to FIG. 4, hereinbelow.

Figure 4:
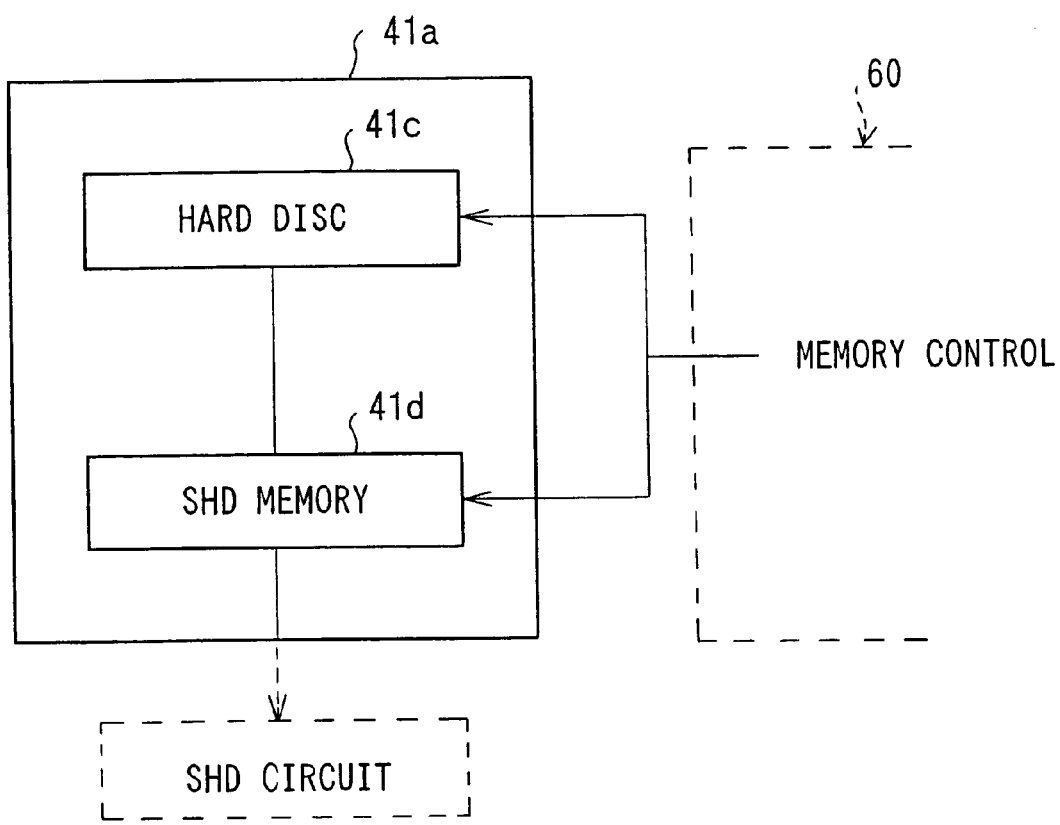
FIG. 4 is a view showing in detail memory control in the image signal read-out system shown in FIG. 1.

As shown in FIG. 4, the memory 41a comprises a large capacity hard disc 41c in which a plurality of sets of data for shading correction are stored by values of parameters (m, n) probable to be selected and a shading memory (SHD memory) 41d which is a temporary memory for transferring data for shading correction read out from the hard disc 41c to a shading circuit (SHD circuit) for shading correction. The characteristic changing means 60 controls the hard disc 41c and the SHD memory 41d. As the method for the characteristic changing means 60 to control the hard disc 41c and the SHD memory 41d, for instance, the following two methods can be employed.

[I] With a plurality of sets of data for shading correction which have been set by values of m and n stored in the hard disc 41c, data for shading correction corresponding to the selected values of m and n is transferred from the hard disc 41c to the SHD memory 41d each time the values of m and n are selected, and the transferred data for shading correction is read out from the SHD memory 41d to the SHD circuit [II] With a plurality of sets of data for shading correction which have been set by values of m and n stored in the hard disc 41c, all the sets of data for shading correction are transferred from the hard disc 41c to the SHD memory 41d at different addresses by the values of m and n at a desired time such as starting of the system, and data for shading correction corresponding to the selected values of m and n is read out from the address of the SHD memory 41d corresponding to the selected values of m and n to the SHD circuit.

When the method [I] where only the selected data for shading correction is transferred to the SHD memory 41d each time the shading correction is to be carried out is employed, the SHD memory 41d may be small in capacity and the hardware may be simple in structure. On the other hand, when the method [II] where all the sets of data for shading correction are transferred from the hard disc 41c to the SHD memory 41d is employed, the software may be simple in structure and the data for shading correction can be read out from the SHD memory 41d at a high speed.

Figure 5:
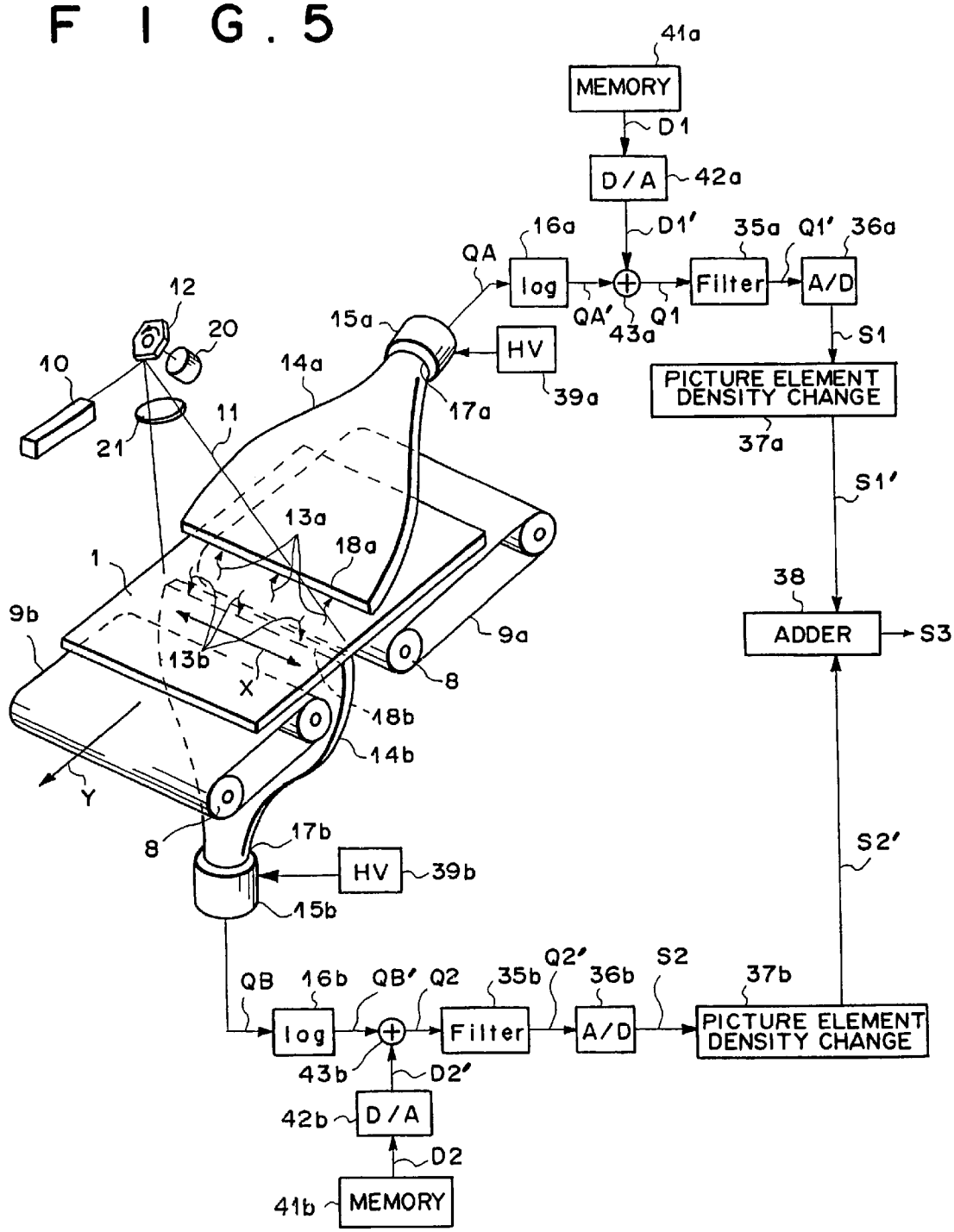
FIG. 5 is a schematic view showing an image signal read-out system in accordance with a second embodiment of the present invention.

Am image signal read-out system in accordance with a second embodiment of the present invention will be described with reference to FIG. 5, hereinbelow. As shown in FIG. 5, the image signal read-out system of the second embodiment is for obtaining a pair of image signals from both the sides of a stimulable phosphor sheet 1 storing thereon a radiation image of an object. In FIG. 5, an image signal read-out system in accordance with the second of the present invention comprises a pair of endless belts 9a and 9b which are driven by electric motors 8 with a stimulable phosphor sheet 1 storing thereon a radiation image placed thereon. There are disposed above the stimulable phosphor sheet 1 a laser 10 emitting a laser beam 11 which stimulates the stimulable phosphor sheet 1, a rotary polygonal mirror 12 which is rotated by an electric motor 20 to deflect the laser beam 11, and a scanning lens 21 which focuses the laser beam 11 deflected by the polygonal mirror 12 on the surface of the stimulable phosphor sheet 1 and causes the laser beam 11 to scan the surface of the stimulable phosphor sheet 1 at a constant speed (main scanning).

A first light guide 14a which collects, from above the stimulable phosphor sheet 1, stimulated emission 13a emitted from the stimulable phosphor sheet 1 in proportion to the stored energy of radiation upon stimulation by the laser beam 11 is disposed close to the stimulable phosphor sheet 1 above the portion of the stimulable phosphor sheet 1 along which the laser beam 11 scan the stimulable phosphor sheet 1. A second light guide 14b which collects, from below the stimulable phosphor sheet 1, stimulated emission 13a emitted from the stimulable phosphor sheet 1 is disposed substantially in perpendicular to the stimulable phosphor sheet 1 below the portion of the stimulable phosphor sheet 1 along which the laser beam 11 scan the stimulable phosphor sheet 1. First and second photomultipliers 15a and 15b are connected to the respective light guides 14a and 14b to photo-electrically detect the stimulated emission 13a collected by the light guides 14a and 14b. First and second logarithmic amplifiers 16a and 16b are connected to the respective photomultipliers 15a and 15b to logarithmically amplify the analog image signals QA and QB respectively detected by the photomultipliers 15a and 15b according to predetermined frequency characteristic and to output logarithmic image signals QA' and QB'.

First and second memories 41a and 41b store two sets of data D1 for shading correction according to sampling intervals which have been set in advance. First and second D/A convertors 42a and 42b are respectively connected to the memories 41a and 41b. The D/A convertor 42a converts the data D1 for shading correction to an analog signal D1' under the control of a reference clock which has been set advance. The D/A convertor 42b converts the data D2 for shading correction to an analog signal D2' under the control of the reference clock. To the D/A convertor 42a is connected, an adder 43a which adds the analog signal D1' for correction to the logarithmic image signal QA' and outputs a shading-corrected image signal Q1. To the D/A convertor 42b is connected, an adder 43b which adds the analog signal D2' for correction to the logarithmic image signal QB' and outputs a shading-corrected image signal Q2.

Further to the adders 43a and 43b are connected anti-aliasing filters 35a and 35b which remove aliasing noise (folded noise) generated by A/D conversion to be described later, and A/D convertors 36a and 36b are connected to the anti-aliasing filters 35a and 35b to convert the filtered image signals Q1' and Q2' to digital image signals S1 and S2 under the control of the reference clock. Each of the anti-aliasing filters 35a and 35b comprises a high-density filter and a low-density filter, and the high-density filter is initially selected and is switched to the low-density filter as required by an input signal from a characteristic changing means 60 to be described later.

A pair of picture element density changing means 37a and 37b are respectively connected to the A/D converters 36a and 36b to change the picture element densities of the digital image signals S1 and S2, thereby obtaining image signal S1, and S2'. The image signals S1' and S2' are added together by an adder 38, whereby an addition signal S3 is obtained.

Figure 6:
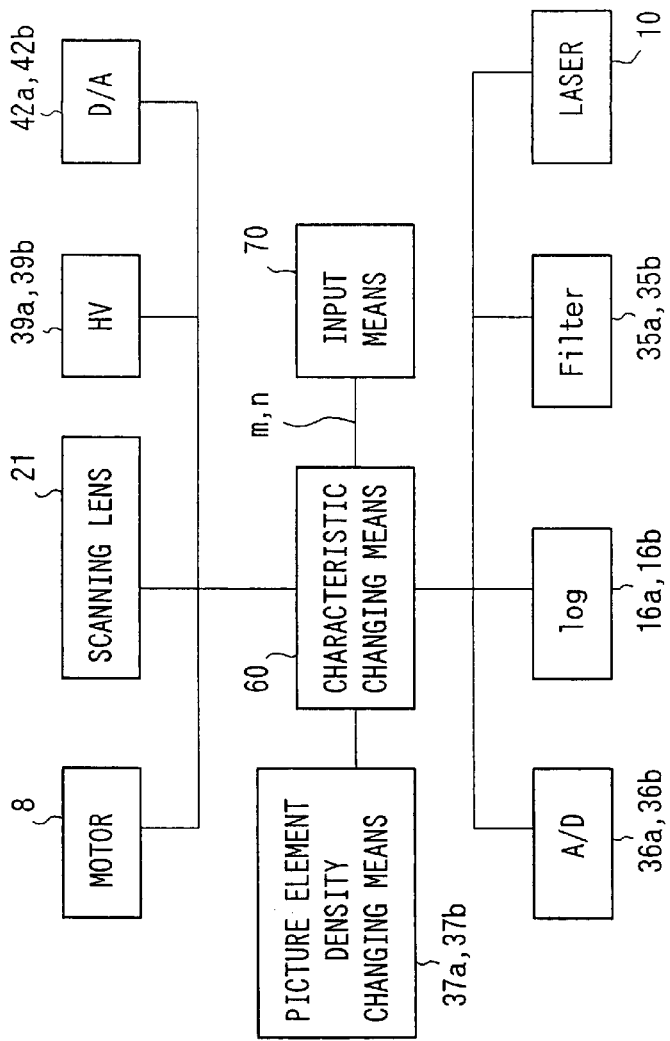
FIG. 6 is a view showing the structure of the characteristic changing means in the image signal read-out system shown in FIG. 5.

As shown in FIG. 6, the image signal read-out system of this embodiment is further provided with an input means 70 which outputs values of parameters (m, n) as m=n=1 when the operator selects "high picture element density" out of "high picture element density" (10 pix/mm) and "low picture element density" (5 pix/mm) and outputs values of the parameters (m, n) as m=n=2 when the operator selects "low picture element density". The image signal read-out system of this embodiment is further provided with a characteristic changing means 60 which, according to the values of the parameters (m, n) input from the input means 70, changes the rotating speed of the electric motors 8 which drive the endless belts 9a and 9b, changes the power of the laser beam 11 by changing the output of the laser 10, changes the beam diameter of the laser beam 11 on the stimulable phosphor sheet 1 by shifting the scanning lens 21 in the direction of its optical axis, changes the sensitivities of the photomultipliers 15a and 15b by controlling the electric voltage application means 39a and 39b, changes the data D1 and D2 for shading correction output from the memories 41a and 41b by changing the sampling clock of the D/A convertors 42a and 42b, changes the timing at which the D/A convertors 42a and 42b read out the data for shading correction from the memories 41a and 41b, changes the sampling clocks of the A/D converters 36a and 36b, changes the frequency characteristics of the logarithmic amplifiers 16a and 16b, switches the high-density filter and the low-density filter of the anti-aliasing filters 35a and 35b, and changes the parameters which are used in picture element density change by the picture element density changing means 37a and 37b.

The picture element density changing means 37a and 37b carry out according to the values of parameters (m, n) picture element density changing processing to multiply the picture element density of the digital image signals Si and S2 by 1/m in the main scanning direction and by 1/n in the sub-scanning direction, thereby obtaining image signals S1, and S2' whose picture element densities are $1/(m \times n)^2$ times those for values of the parameters of m=n=1. Specifically, the picture element density changing processing may be carried out, for instance, by effecting one-dimensional mask operation in both the main scanning direction and the sub-scanning direction of the digital image signals S1 and S2, by thinning picture elements according to the desired picture element density, by high-order interpolation operation such as B-spline interpolation or cubic spline interpolation, or by linear interpolation. At this time, the parameter of the picture element density changing is changed according to the values of the parameters (m, n). The parameter for the one-dimensional mask operation is a coefficient of mask, and the parameter for thinning the picture elements is the intervals at which the picture elements are thinned. When interpolation operation is employed, the kind of the interpolation operation to be carried out on the digital image signals S1 and S2 is changed.

In the adder 38, it is preferred that an addition image signal S3 be obtained after carrying out filtering processing, using a filter having frequency response properties such as will increase the S/N ratio of the addition image signal S3, on the image signals S1' and S2' as disclosed in Japanese Unexamined Patent Publication No. 7(1995)-287330) though the image signals S1' and S2' may be simply added together. The filtering processing may be carried out in the picture element density changing means 37a and 37b.

Operation of the radiation image signal read-out system of this embodiment will be described, hereinbelow.

A signal representing "high picture element density" (an initialization of the system) selected by the operator is input into the input means 70. Then the input means 70 outputs values of the parameters (m, n) corresponding to "high picture element density", that is, (m, n)=(1, 1), to the characteristic changing means 60.

The characteristic changing means 60 sets upon receipt of the values of the parameters, (m, n)=(1, 1), the rotating speed of the electric motors 8 for driving the endless belts 9a and 9b, the output of the laser 10, the position of the scanning lens 21, the control signals to the electric voltage application means 39a and 39b, the sampling clocks of the D/A convertors 42a and 42b, the timings at which the D/A convertors 42a and 42b read out the data D1 and D2 for shading correction from the memories 41a and 41b, the sampling clocks of the A/D convertors 36a and 36b, the frequency characteristics of the logarithmic amplifiers 16a and 16b, the anti-aliasing filters 35a and 35b, and the picture element density changing means 37a and 37b to initial states, which correspond to "high picture element density".

The endless belts 9a and 9b are moved in the direction of arrow Y (FIG. 5) with a stimulable phosphor sheet 1 set on the endless belts 9a and 9b, whereby the stimulable phosphor sheet 1 is conveyed in the direction of arrow Y (sub-scanning). The laser beam 11 emitted from the laser 10 is deflected by the rotary polygonal mirror 12 rotated by the electric motor 20 at a high speed in the direction of the arrow, and the deflected laser beam 11 is converged on the surface of the stimulable phosphor sheet 1 conveyed by the endless belts 9a and 9b and caused to scan the stimulable phosphor sheet 1 in the direction of arrow X substantially perpendicular to the sub-scanning direction (main scanning) through the scanning lens 21.

The parts of the stimulable phosphor sheet 1 exposed to the laser beam 11 emit stimulated emission 13a upward from the upper side of the sheet 1 and stimulated emission 13b downward from the lower side of the sheet 1 in proportion to the radiation energy stored thereon. The upward stimulated emission 13a enters the light guide 14a through the light inlet end face 18a of the light guide 14a and is guided the inside of the light guide 14a through total reflection to the photomultiplier 15a. The photomultiplier 15a photoelectrically converts the upward stimulated emission 13a to an analog image signal QA. Similarly, the downward stimulated emission 13b enters the light guide 14b through the light inlet end face 18b of the light guide 14b and is guided the inside of the light guide 14b through total reflection to the photomultiplier 15b. The photomultiplier 15b photoelectrically converts the downward stimulated emission 13b to an analog image signal QB.

The analog image signals QA and QB are input into the logarithmic amplifiers 16a and 16b. The analog image signal QA is converted by the logarithmic amplifier 16a, which has been set to have a frequency characteristic for "high picture element density", to a logarithmic image signal QA' and the analog image signal QB is converted by the logarithmic amplifier 16b, which has been set to have a frequency characteristic for "high picture element density", to a logarithmic image signal QB'. The logarithmic image signals QA' and QB' output from the logarithmic amplifiers 16a and 16b are respectively input into the adders 43a and 43b.

The data D1 and D2 for shading correction for "high picture element density" stored in the memory 41a and 41b are read out by the D/A convertor 42a and 42b at a timing for "high picture element density" and converted to analog signals D1' and D2' at a sampling rate governed by the reference clock, which is a clock for "high picture element density".

Figure 7:
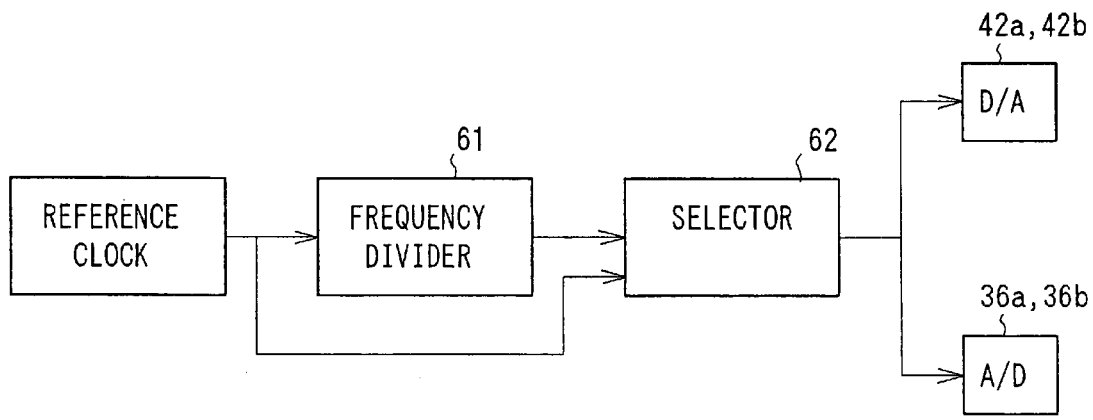
FIG. 7 is a view showing an example of a structure for changing the clock pulses.

The clock input into the D/A convertors 42a and 42b here is the reference clock which is selectively output to the D/A convertors 42a and 42b and the A/D convertors 36a and 36b by a selector 62 provided in the characteristic changing means 60 as shown in FIG. 7.

The analog signals D1' and D2' for shading correction are input into the adders 43a and 43b and added respectively to the logarithmic image signals QA' and QB' input from the logarithmic amplifiers 16a and 16b, whereby the logarithmic image signals QA' and QB' are converted to shading-corrected image signals Q1 and Q2. The shading-corrected image signals Q1 and Q2 are respectively input into the anti-aliasing filters 35a and 35b.

The anti-aliasing filters 35a and 35b have been switched to the high-density filter by the characteristic changing means 60 and the image signals Q1 and Q2 input into the anti-aliasing filters 35a and 35b are properly removed with aliasing noise by the high-density filter. The image signals Q1' and Q2' removed with aliasing noise are input into the A/D converters 36a and 36b.

The A/D converters 36a and 36b convert the image signals Q1' and Q2' to digital image signals S1 and S2 at a sampling rate governed by the reference clock, which is input into the A/D converters 36a and 36b at this time by the selector 62 of the characteristic changing means 60.

The picture element density changing means 37a and 37b carry out picture element density changing processing to multiply the picture element density of the digital image signals S1 and S2 by 1/m in the main scanning direction and by 1/n in the sub-scanning direction. However, since m=n=1 here, the image signals S1' and S2' are obtained without carrying out picture element density changing processing.

The adder 38 carries out filtering processing, using a filter having frequency response properties such as will increase the S/N ratio of an addition image signal S3, on the image signals S1' and S2' as disclosed in Japanese Unexamined Patent Publication No. 7(1995)-287330) and adds together the filtered image signals S1' and S2' by picture elements corresponding to each other, thereby obtaining an addition image signal S3. The addition image signal S3 is output to, for instance, an image processing system.

Operation of the radiation image signal read-out system of this embodiment when the operator selects "low picture element density" will be described hereinbelow.

When a signal representing "low picture element density" is input into the input means 70 by the operator, the input means 70 outputs values of the parameters (m, n) corresponding to "low picture element density", that is, (m, n)=(2, 2), to the characteristic changing means 60.

The characteristic changing means 60 sets upon receipt of the values of the parameters, (m, n)=(2, 2), the rotating speed of the electric motors 8 for driving the endless belts 9a and 9b, the output of the laser 10, the position of the scanning lens 21, the control signals to the electric voltage application means 39a and 39b, the sampling clocks of the D/A convertors 42a and 42b, the timings at which the D/A convertors 42a and 42b read out the data D1 and D2 for shading correction from the memories 41a and 41b, the sampling clocks of the A/D convertors 36a and 36b, the frequency characteristics of the logarithmic amplifiers 16a and 16b, the anti-aliasing filters 35a and 35b, and the picture element density changing means 37a and 37b to those which correspond to "low picture element density".

Specifically, the characteristic changing means 60 doubles the rotating speed of the motors 8, doubles the output of the laser 10, shifts the scanning lens 21 to a position where the beam diameter of the laser beam 11 on the surface of the stimulable phosphor sheet 1 is substantially doubled, changes the control signals to the electric voltage application means 39a and 39b to that which lowers the sensitivity of the photomultipliers 15a and 15b, changes the timings at which the D/A convertors 42a and 42b read out the data D1 and D2 for shading correction from the memories 41a and 41b, switches the selector 62 (FIG. 7) so that the clock output from a frequency divider 61 (clock which is obtained by frequency-dividing the reference clock and is twice the reference clock in cycles) is selectively input into the D/A convertors 42a and 42b and the A/D converters 36a and 36b, changes the frequency characteristic of the logarithmic amplifiers 16a and 16b to that for "low picture element density", switches the anti-aliasing filters 35a and 35b to the low-density filter, and changes the parameters for picture element density changing processing by the picture element density changing means 37a and 37b.

With this condition, image signals are read out in the same manner as in the "high picture element density read-out"

That is, the endless belts 9a and 9b are moved in the direction of arrow Y at double the speed for "high picture element density" with a stimulable phosphor sheet 1 set on the endless belts 9a and 9b, whereby the stimulable phosphor sheet 1 is conveyed in the direction of arrow Y at double the speed for "high picture element density" (sub-scanning).

The laser beam 11 emitted from the laser 10 which is double in power is deflected by the rotary polygonal mirror 12 rotated by the electric motor 20 at the same speed as for "high picture element density", and the deflected laser beam 11 is converged on the surface of the stimulable phosphor sheet 1 conveyed by the endless belt 9a and caused to scan the stimulable phosphor sheet 1 at a constant speed in the direction of arrow X (main scanning) by the scanning lens 21. At this time, the diameter of the laser beam 11 converged on the surface of the stimulable phosphor sheet 1 is double the beam diameter in the "high picture element density read-out".

The parts of the stimulable phosphor sheet 1 exposed to the laser beam 11 emit stimulated emission 13a and 13b in proportion to the radiation energy stored thereon, and the stimulated emission 13a and 13b is guided to the photomultipliers 15a and 15b.

The photomultipliers 15a and 15b have been applied with a voltage, which gives a sensitivity lower than that for "high picture element density", by the electric voltage application means 39a and 39b, detect the stimulated emission 13a and 13b at the sensitivity for "low picture element density", and converts the stimulated emission 13a and 13b to analog image signals QA and QB. The analog image signals QA and QB output from the photomultipiers 15a and 15b are input into the logarithmic amplifiers 16a and 16b. The analog image signal QA and QB are converted by the logarithmic amplifiers 16a and 16b, which have been set to have a frequency characteristic for "low picture element density", to logarithmic image signals QA' and QB'. The logarithmic image signals QA' and QB' output from the logarithmic amplifiers 16a and 16b are respectively input into the adders 43a and 43b.

The data D1 and D2 for shading correction for "high picture element density" stored in the memories 41a and 41b are read out at the timings for "low picture element density" by the D/A convertors 42a and 42b and converted to analog signals D1' and D2' at a sampling rate governed by a clock for "low picture element density" which is half the reference clock in frequency. That is, a frequency divider 61 provided in the characteristic changing means 60 divides the frequency of the reference clock and generates a clock for "low picture element density" which is double the reference clock in cycle. The selector 62 has been switched to selectively input the clock for "low picture element density" output from the frequency divider 61 into the D/A convertors 42a and 42b and the A/D convertors 36a and 36b. As a result, the analog signals D1' and D2' for "low picture element density" are half the data D1 and D2 for shading correction for "high picture element density" in the number of picture elements in the main scanning direction.

The analog signals D1' and D2' for shading correction are input into the adders 43a and 43b and added to the logarithmic image signals QA' and QB' input from the logarithmic amplifiers 16a and 16b, whereby the logarithmic image signals QA' and QB' are converted to shading-corrected image signals Q1 and Q2. The shading-corrected image signals Q1 and Q2 are input into the anti-aliasing filters 35a and 35b.

The anti-aliasing filters 35a and 35b have been switched to the low-density filter by the characteristic changing means 60 and the image signals Q1 and Q2 input into the anti-aliasing filters 35a and 35b are properly removed with aliasing noise by the low-density filter. The image signals Q1' and Q2' removed with aliasing noise are input into the A/D converters 36a and 36b. The A/D converters 36a and 36b convert the image signals Q1' and Q2' to digital image signals S1 and S2 at a sampling rate governed by the clock for "low picture element density", which is input into the A/D converter 36a and 36b at this time by the selector 62 of the characteristic changing means 60.

The picture element density changing means 37a and 37b carry out picture element density changing processing for changing the picture element density to 1/m times in the main scanning direction of the digital image signals S1 and S2 and to 1/n times in the sub-scanning direction of the same. Since m=n=2 here, the picture element density of each of the digital image signals S1 and S2 is reduced to ½ in both the main scanning direction and the sub-scanning direction. One-dimensional mask operation will be described hereinbelow as an example of the picture element density changing processing. An example of a one-dimensional filter used in the one-dimensional mask operation is as follows.

$$a(x, 1)=(-8/105, -5/105, 34/105, 63/105, 34/105, -5/105, 8/105)$$

Using the one-dimensional filter a(x, 1), filtering processing is carried out at intervals of one picture element in the main scanning direction of each of the digital image signals S1 and S2, and then filtering processing is carried out at intervals of one picture element in the sub-scanning direction of each of the digital image signals S1 and S2. This will be described in more specifically on only the digital image signal S1. When the values of picture elements of the digital image signal S1 are represented by S1(x, y) and the values of picture elements obtained by picture element density changing processing in the main scanning direction are represented by S1A(x/2, y), the values of picture elements S1A(x/2, y) are calculated according to the following formula (1).

$$S1A(k/2,l)=a(1,1)*S1(k-3,l)+a(2,1)*S1(k-2,l)+a(3,1)*S1(k-1,l)+a(4,1)*S1(k,l)+a(5,1)*S1(k+1,l)+a(6,1)*S1(k+2,l)+a(7,1)*S1(k+3,l) \quad (1)$$

wherein k=1 to N (N being the number or position of the picture element as numbered in the main scanning direction) and l=1 to M (M being the number or position of the picture element as numbered in the sub-scanning direction). Operation according to formula (1) is carried out also in the sub-scanning direction, whereby image signals S1' and S2' changed with picture element density are obtained.

In such mask operation using a one-dimensional filter, data for mask operation becomes short at an edge of the digital image signals S1 and S2. For example, in such an image signal as shown in FIG. 8, when filtering is carried out on picture element S1(1, 1) or S1(N, 1), data becomes short by three picture elements. In such a case, imaginary picture elements S1 (−1, 1), S1(−2, 1) and S1(−3, 1) or S1 (N+1, 1), S1 (N+2, 1) and S1 (N+3, 1) are set, and the values of picture element S1(1, 1) or S1(N, 1) are copied to the imaginary picture elements. Then the filtering processing is carried out by use of the imaginary picture elements.

The picture element density changing processing in the picture element density changing means 37a and 37b may be carried out by picture element thinning processing or interpolation operation without limited to mask operation.

As the interpolation operation, high-order interpolation operation such as B-spline interpolation operation where weight is given to smoothness or Cubic spline interpolation operation where weight is given to sharpness may be applied as well as linear interpolation.

The Cubic spline interpolation operation and the B-spline interpolation operation will be described, hereinbelow. It is assumed that the image signals S1 and S2 in this embodiment have signal values $(S_{k-2}, S_{k-1}, S_k, S_{k-1}, S_{k-2}, \ldots)$ respectively corresponding to sampling points (picture elements) $X_{k-2}, X_{k-1}, X_k, X_{k+1}, X_{k+2}, \ldots$ arranged in one direction at regular intervals. In the Cubic spline interpolation operation, coefficients of interpolation $c_{k-1}, c_k, c_{k+1}$ and $c_{k+2}$ respectively corresponding to interpolation data $Y_{k-1}, Y_k, Y_{k+1}$ and $Y_{k+2}$ in the following cubic spline interpolation operation expression (2) which represents interpolation data Y' for an interpolating point $X_p$ between original sampling points (picture elements) $X_k$ and $x_{k+1}$ are calculated according to the following formulae.

$$Y' = c_{k-1}Y_{k-1} + c_k Y_k + c_{k+1}Y_{k+1} + c_{k+2}Y_{k+2}$$

$$c_{k-1} = (-t^3 + 2t^2 - t)/2$$

$$c_k = (3t^3 - 5t^2 + 2)/2$$

$$c_{k+1} = (-3t^3 + 4t^2 + t)/2$$

$$c_{k+2} = (t^3 - t^2)/2 \quad (2)$$

wherein $t (0 \leq t \leq 1)$ represents the position of an interpolating point $X_p$ toward a picture element $X_{k+1}$ from a reference picture element $X_k$ when the sampling intervals in the main scanning direction and the sub-scanning direction are assumed to be 1.

In the B-spline interpolation operation, coefficients of interpolation $b_{k-1}$, $b_k$, $b_{k+1}$ and $b_{k+2}$ respectively corresponding to interpolation data $Y_{k-1}$, $Y_k$, $Y_{k+1}$ and $Y_{k+2}$ in the following cubic B-spline interpolation operation expression (3) which represents interpolation data Y' for an interpolating point $X_p$ between original sampling points (picture elements) $X_k$ and $x_{k+1}$ are calculated according to the following formulae.

$$Y' = b_{k-1}Y_{k-1} + b_k Y_{k+bk+1} Y_{k+1+bk+2}Y_{k+2}$$

$$b_{k-1} = (-t^3 + 3t^2 - 3t + 1)/6$$

$$b_k = (3t^3 - 6t^2 + 4)/6$$

$$b_{k+1} = (-3t^3 + 3t^2 + 3t + 1)/6$$

$$b_{k+2} = t^3/6 \quad (2)$$

wherein $t(0 \leq t \leq 1)$ represents the position of an interpolating point $X_p$ toward a picture element $X_{k+1}$ from a reference picture element $X_k$ when the sampling intervals in the main scanning direction and the sub-scanning direction are assumed to be 1.

In this embodiment, the kind of the interpolation operation (including linear interpolation operation is selected according to the values of m and n.

The image signals S1' and S2' obtained by the picture element density changing means 37a and 27b are input into the adder 38. The picture element density when "low picture element density" is selected becomes 1/16 of that when "high picture element density" is selected.

The adder 38 carries out filtering processing, using a filter having frequency response properties such as will increase the S/N ratio of an addition image signal S3, on the image signals S1' and S2' as disclosed in Japanese Unexamined Patent Publication No. 7(1995)-287330) and adds together the filtered image signals S1' and S2' by picture elements corresponding to each other, thereby obtaining an addition image signal S3. The addition image signal S3 is output to, for instance, an image processing system.

As can be understood from the description above, in the radiation image signal read-out system of this embodiment, a low picture element density image signal whose picture element density is ½ of that of the high picture element density in both the main scanning direction and the sub-scanning direction and is ¼ of that of the high picture element density in total is obtained without changing the main scanning speed of the laser beam 11 and an image signal whose picture element density is 1/16 of that of the high picture element density is obtained by carrying out picture element density changing processing, which reduces the picture element density to ½ in both the main scanning direction and the sub-scanning direction. At the same time, since the characteristic changing means 60 changes, according to the parameters which determine the picture element density, the position of the scanning lens 21, the control signal to the electric voltage application means 39a and 39b, the sampling clock for the D/A convertors 42a and 42b, the frequency characteristics of the logarithmic amplifiers 16a and 16b, the filters of the anti-aliasing filters 35a and 35b, and the parameters of the picture element density changing means 37a and 37b, a low picture element density image signal can be read out with the amount of energy applied to the stimulable phosphor sheet per one picture element, the sensitivities of the photomultipliers, the shading correction and suppression of aliasing noise set properly according to the read-out picture element density.

Especially in the case of "the both-side reading" as in the second embodiment, it is necessary to slow the scanning speed as compared with the case where signal light from one side of the recording medium is to be detected in order to give energy of the light beam sufficiently to the back side of the recording medium. However even in the case of the both-side reading, the scanning time can be shortened by increasing the sub-scanning speed so long as the picture element density can be lowered, whereby the time required to scan a stimulable phosphor sheet can be shortened.

Further, by carrying out the picture element density changing processing on the two digital image signals S1 and S2 and obtaining the addition signal by adding the processed image signals, the amount of operation in addition mask processing to be performed when the digital image signals S1 and S2 are added can be reduced, whereby the time required to add the digital image signals can be shortened and the processing can be carried out in a shorter time.

Though, in the second embodiment described above, the system is set for the high picture element density reading in the initial state, the system may be arranged to be initially set for the standard picture element density reading and to be switched for the high picture element density reading and the low picture element density reading.

When the picture element density in the standard picture element density reading is 10 pix/mm and the main scanning speed (main scanning frequency) is 160 Hz, the sampling intervals in the main scanning direction, the pitches of picture elements in the sub-scanning direction, the sub-scanning speed and the cut-off frequency of the anti-aliasing filter may be, for instance, as follows.

sampling intervals in the main scanning direction: 100 μm pitches of picture elements in the sub-scanning direction: 100 μm sampling cycles in the main scanning direction: 1.0 μsec sub-scanning speed: 16 mm/sec cut-off frequency of the anti-aliasing filter: 500 kHz (Since being an analog filter, the cut-off frequency is preferably not higher than 500 kHz, e.g., 400 kHz)

In the case of high picture element density reading where the picture element density is 20 pix/mm, these factors are changed to as follows with the main scanning speed kept unchanged at 160 Hz.

sampling intervals in the main scanning direction: 50 μm pitches of picture elements in the sub-scanning direction: 50 μm sampling cycles in the main scanning direction: 0.5 μsec sub-scanning speed: 8 mm/sec cut-off frequency of the anti-aliasing filter: 1000 kHz In the case of low picture element density reading where the picture element density is 5 pix/mm, these factors are changed to as follows with the main scanning speed kept unchanged at 160 Hz.

sampling intervals in the main scanning direction: 200 μm pitches of picture elements in the sub-scanning direction: 200 μm sampling cycles in the main scanning direction: 2.0 μsec sub-scanning speed: 32 mm/sec cut-off frequency of the anti-aliasing filter: 250 kHz Though, in the second embodiment, the read-out picture element density is set stepwise like "high picture element density" and "low picture element density", the system may be arranged so that the read-out picture element density can be freely set by selecting the parameters (m, n) which determine the read-out picture element density.

Though, in the second embodiment, picture element density changing processing is carried out on each of the digital image signals S1 and S2 before they are added, picture element density changing processing may be carried out on an addition image signal S3 obtained by adding the digital image signals S1 and S2.

Further, though in the second embodiment, picture element density changing processing for changing the number of the picture elements of the digital image signals S1 and S2 in the main scanning direction to 1/m times and the number of the picture elements in the sub-scanning direction to 1/n times is carried out in the picture element density changing means 37a and 37b, picture element density changing processing for changing the number of the picture elements in the main scanning direction to a/m (a>0) times and the number of the picture elements in the sub-scanning direction to a/n times may be carried out in the picture element density changing means 37a and 37b. In this case, the picture element density of the addition image signal S3 becomes $(a/m \times n)^2$.

Figure 9:
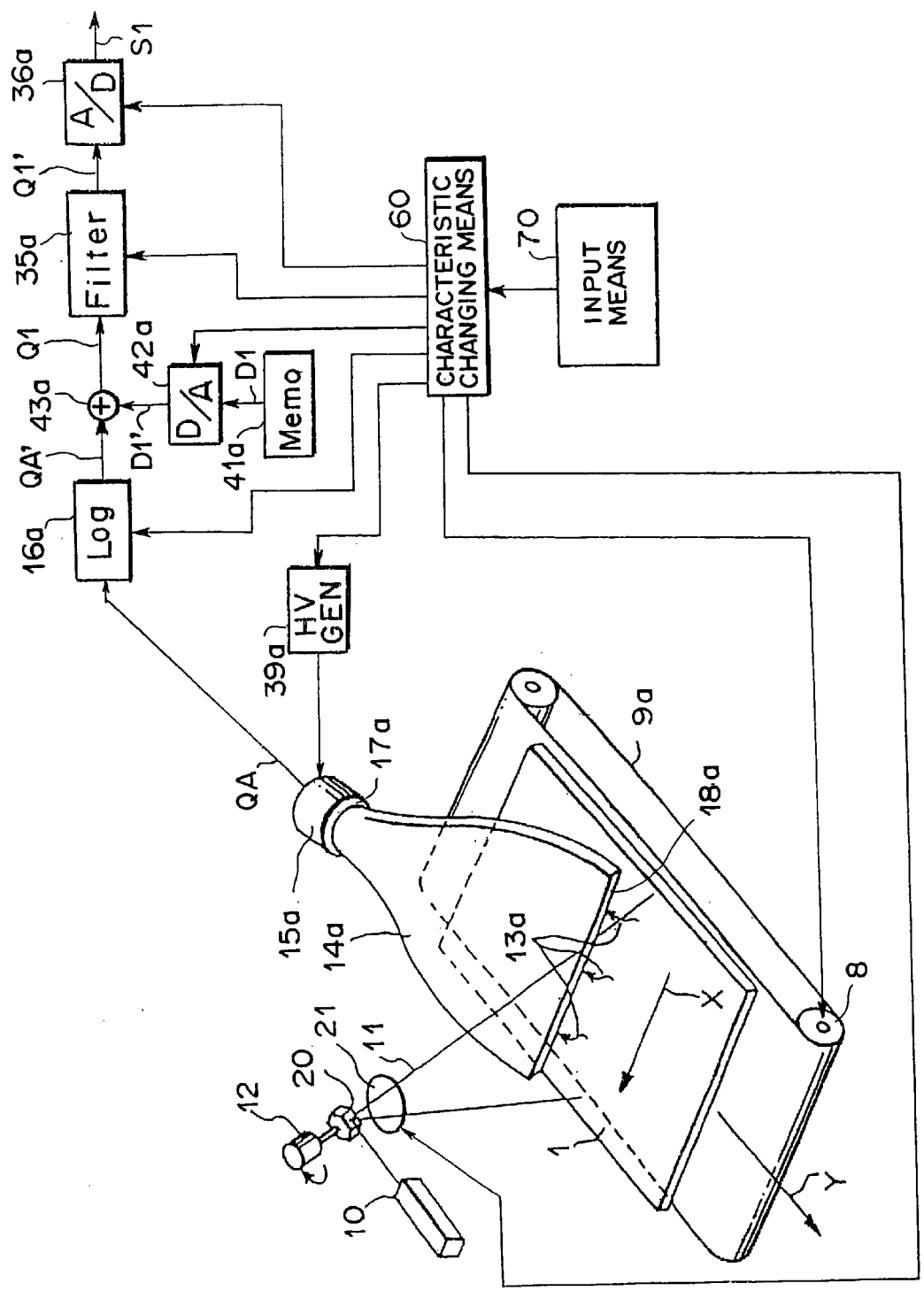
FIG. 9 is a schematic view showing an image signal read-out system in accordance with a third embodiment of the present invention.

FIG. 9 shows an image signal read-out system in accordance with a third embodiment of the present invention. In FIG. 9, the image signal read-out system of the third embodiment comprises an endless belt 9a which is driven by an electric motor 8 with a stimulable phosphor sheet 1 storing thereon a radiation image placed thereon. There are disposed above the stimulable phosphor sheet 1 a laser 10 emitting a laser beam 11 which stimulates the stimulable phosphor sheet 1, a rotary polygonal mirror 12 which is rotated by an electric motor 20 to deflect the laser beam 11 at a speed corresponding to a main scanning frequency of 160 Hz, and a scanning lens 21 which converges the laser beam 11 deflected by the polygonal mirror 12 onto the surface of the stimulable phosphor sheet 1 and causes the laser beam 11 to scan the surface of the stimulable phosphor sheet 1 at a constant speed (main scanning).

Just above the stimulable phosphor sheet 1, there is disposed close to the stimulable phosphor sheet 1 a light guide 14a which collects stimulated emission 13a which is emitted from the upper surface of the stimulable phosphor sheet 1 in proportion to the stored energy of radiation upon stimulation by the laser beam 11. A photomultiplier 15a is connected to the light guide 14a to photoelectrically detect the stimulated emission 13a collected by the light guide 14a and convert it to an analog image signal QA. The photomultiplier 15a detects the stimulated emission 13a at a sensitivity which is determined by an electric voltage applied to the photomultiplier 15a by an electric voltage application means 39a.

A logarithmic amplifier 16a is connected to the photomultiplier 15a to logarithmically amplify the analog image signal QA detected by the photomultiplier 15a according to predetermined frequency characteristic and to output a logarithmic image signal QA'.

A memory 41a stores data D1 for shading correction according to sampling intervals which have been set in advance and a D/A convertor 42a is connected to the memory 41a. The D/A convertor 42a converts the data D1 for shading correction to an analog signal D1' under the control of a reference clock. To the D/A convertor 42a is connected an adder 43a which adds the analog signal D1' for correction to the logarithmic image signal QA' and outputs a shading-corrected image signal Q1.

Further to the adder 43a is connected an anti-aliasing filter 35a which removes aliasing noise (folded noise) generated by A/D conversion to be described later, and an A/D convertor 36a is connected to the anti-aliasing filter 35a to convert the filtered image signal Q1' to a digital image signal S1 under the control of a reference clock which has been set in advance. The anti-aliasing filter 35a comprises a high-density filter and a low-density filter, and the high-density filter is initially selected and is switched to the low-density filter as required by an input signal from a characteristic changing means 60 to be described later.

The image signal read-out system of this embodiment is further provided with an input means 70 which outputs values of parameters (m, n) as m=n=1 when the operator selects "high picture element density", out of "high picture element density" (10 pix/mm) and "low picture element density" (5 pix/mm) and outputs values of the parameters (m, n) as m=n=2 when the operator selects "low picture element density". The image signal read-out system of this embodiment is further provided with a characteristic changing means 60 which, according to the values of the parameters (m, n) input from the input means 70, changes the rotating speed of the electric motor 8 which drives the endless belt 9a, changes the beam diameter of the laser beam 11 on the stimulable phosphor sheet 1 by shifting the scanning lens 21 in the direction of its optical axis, changes the sensitivity of the photomultiplier 15a by controlling the electric voltage application means 39a, changes the data for shading correction output from the memory 41a by changing the sampling clock of the D/A convertor 42a, changes the sampling clock of the A/D convertor 36a, changes the frequency characteristics of the logarithmic amplifier 16a, and switches the high-density filter and the low-density filter of the anti-aliasing filter 35a.

Operation of the radiation image read-out system of this embodiment will be described, hereinbelow.

A signal representing "high picture element density" (an initialization of the system) selected by the operator is input into the input means 70. Then the input means 70 outputs values of the parameters (m, n) corresponding to "high picture element density", that is, (m, n)=(1, 1), to the characteristic changing means 60.

The characteristic changing means 60 sets upon receipt of the values of the parameters, (m, n)=(1, 1), the rotating speed of the electric motor 8 for driving the endless belt 9a, the position of the scanning lens 21, the control signal to the electric voltage application means 39a, the sampling clock of the D/A convertor 42a, the sampling clock of the A/D convertor 36a, the frequency characteristic of the logarithmic amplifier 16a, and the anti-aliasing filter 35a to initial state, which correspond to "high picture element density".

The endless belt 9a is moved in the direction of arrow Y (FIG. 9) at a speed for "high picture element density" with a stimulable phosphor sheet 1 set in a predetermined position on the endless belt 9a, whereby the stimulable phosphor sheet 1 is conveyed in the direction of arrow Y at the speed for "high picture element density" (sub-scanning).

The laser beam 11 emitted from the laser 10 is deflected by the rotary polygonal mirror 12 rotated by the electric motor 20 at a high speed in the direction of the arrow, and the deflected laser beam 11 is converged on the surface of the stimulable phosphor sheet 1 conveyed by the endless belt 9a and caused to scan the stimulable phosphor sheet 1 at a constant speed in the direction of arrow X (main scanning) through the scanning lens 21.

The parts of the stimulable phosphor sheet 1 exposed to the laser beam 11 emit stimulated emission 13a in proportion to the radiation energy stored thereon, and the stimulated emission 13a enters the light guide 14a through the light inlet end face 18a of the light guide 14a and is guided the inside of the light guide 14a through total reflection to the photomultiplier 15a.

The photomultiplier 15a has been applied with a high voltage, which gives a sensitivity corresponding to "high picture element density", by the electric voltage application means 39a, detects the stimulated emission 13a at the sensitivity for "high picture element density", and converts the stimulated emission 13a to an analog image signal QA. The analog image signal QA output from the photomultiplier 15a is input into the logarithmic amplifier 16a. The analog image signal QA is converted by the logarithmic amplifier 16a, which has been set to have a frequency characteristic for "high picture element density", to a logarithmic image signal QA'. The logarithmic image signal QA' output from the logarithmic amplifier 16a is input into the adder 43a.

The data D1 for shading correction for "high picture element density" stored in the memory 41a is converted to an analog signal D1' by the D/A convertor 42a at a sampling rate governed by the reference clock, which is a clock for "high picture element density".

The clock input into the D/A convertor 42a here is the reference clock which is selectively output to the D/A convertor 42a and the A/D convertor 36a by a selector 62 provided in the characteristic changing means 60 as shown in FIG. 2.

The analog signal D1' for shading correction is input into the adder 43a and added to the logarithmic image signal QA' input from the logarithmic amplifier 16a, whereby the logarithmic image signal QA' is converted to a shading-corrected image signal Q1. The shading-corrected image signal Q1 is input into the anti-aliasing filter 35a.

The anti-aliasing filter 35a has been switched to the high-density filter by the characteristic changing means 60 and the image signal Q1 input into the anti-aliasing filter 35a is properly removed with aliasing noise by the high-density filter. The image signal Q1' removed with aliasing noise is input into the A/D converter 36a. The A/D converter 36a converts the image signal Q1' to a digital image signal S1 at a sampling rate governed by the reference clock, which is input into the A/D converter 36a at this time by the selector 62 of the characteristic changing means 60. The digital image signal S1 is output, for instance, to an image processing system.

Operation of the radiation image read-out system of this embodiment when the operator selects "low picture element density" will be described hereinbelow.

When a signal representing "low picture element density" is input into the input means 70 by the operator, the input means 70 outputs values of the parameters (m, n) corresponding to "low picture element density", that is, (m, n)=(2, 2), to the characteristic changing means 60.

The characteristic changing means 60 sets upon receipt of the values of the parameters, (m, n)=(2, 2), the rotating speed of the electric motor 8 for driving the endless belt 9a, the position of the scanning lens 21, the control signal to the electric voltage application means 39a, the sampling clock of the D/A convertor 42a, the sampling clock of the A/D convertor 36a, the frequency characteristic of the logarithmic amplifier 16a, and the anti-aliasing filter 35a to those which correspond to "low picture element density". Specifically, the characteristic changing means 60 doubles the rotating speed of the motor 8, shifts the scanning lens 21 to a position where the beam diameter of the laser beam 11 on the surface of the stimulable phosphor sheet 1 is substantially doubled, changes the control signal to the electric voltage application means 39a to that which lowers the sensitivity of the photomultiplier 15a, switches the selector 62 (FIG. 2) so that the clock output from a frequency divider 61 (clock which is obtained by frequency-dividing the reference clock and is twice the reference clock in cycles) is selectively input into the D/A convertor 42a and the A/D converter 36a, changes the frequency characteristic of the logarithmic amplifier 16a to that for "low picture element density", and switches the anti-aliasing filter 35a to the low-density filter.

With this condition, an image signal is read out in the same manner as in the "high picture element density read-out".

That is, the endless belt 9a is moved in the direction of arrow Y at double the speed for "high picture element density" with a stimulable phosphor sheet 1 set in a predetermined position on the endless belt 9a, whereby the stimulable phosphor sheet 1 is conveyed in the direction of arrow Y at double the speed for "high picture element density" (sub-scanning).

The laser beam 11 emitted from the laser 10 is deflected by the rotary polygonal mirror 12 rotated by the electric motor 20 at the same speed as for "high picture element density", and the deflected laser beam 11 is converged on the surface of the stimulable phosphor sheet 1 conveyed by the endless belt 9a and caused to scan the stimulable phosphor sheet 1 at a constant speed in the direction of arrow X (main scanning) by the scanning lens 21. At this time, the diameter of the laser beam 11 converged on the surface of the stimulable phosphor sheet 1 is double the beam diameter in the "high picture element density read-out".

The parts of the stimulable phosphor sheet 1 exposed to the laser beam 11 emit stimulated emission 13a in proportion to the radiation energy stored thereon, and the stimulated emission 13a is guided to the photomultiplier 15a.

The photomultiplier 15a has been applied with a voltage, which gives a sensitivity lower than that for "high picture element density", by the electric voltage application means 39a, detects the stimulated emission 13a at the sensitivity for "low picture element density", and converts the stimulated emission 13a to an analog image signal QA.

The analog image signal QA output from the photomultiplier 15a is input into the logarithmic amplifier 16a. The analog image signal QA is converted by the logarithmic amplifier 16a, which has been set to have a frequency characteristic for "low picture element density", to a logarithmic image signal QA'. The logarithmic image signal QA' output from the logarithmic amplifier 16a is input into the adder 43a.

The data D1 for shading correction for "high picture element density" stored in the memory 41a is converted to an analog signal D1' by the D/A convertor 42a at a sampling rate governed by a clock for "low picture element density" which is half the reference clock in frequency. That is, a frequency divider 61 provided in the characteristic changing means 60 divides the frequency of the reference clock and generates a clock for "low picture element density" which is double the reference clock in cycle. The selector 62 has been switched to selectively input the clock for "low picture element density" output from the frequency divider 61 into the D/A convertor 42a and the A/D convertor 36a. As a result, the analog signal D1' for "low picture element density" is half the analog signal D1' for "high picture element density" in the number of picture elements in the main scanning direction.

The analog signal D1' for shading correction is input into the adder 43a and added to the logarithmic image signal QA' input from the logarithmic amplifier 16a, whereby the logarithmic image signal QA' is converted to a shading-corrected image signal Q1. The shading-corrected image signal Q1 is input into the anti-aliasing filter 35a.

The anti-aliasing filter 35a has been switched to the low-density filter by the characteristic changing means 60 and the image signal Q1 input into the anti-aliasing filter 35a is properly removed with aliasing noise by the low-density filter. The image signal Q1' removed with aliasing noise is input into the A/D converter 36a.

The A/D converter 36a converts the image signal Q1' to a digital image signal S1 at a sampling rate governed by the clock for "low picture element density", which is input into the A/D converter 36a at this time by the selector 62 of the characteristic changing means 60.

As can be understood from the description above, in the radiation image read-out system of this embodiment, a low picture element density image signal whose picture element density is ½ of that of the high picture element density in both the main scanning direction and the sub-scanning direction and is ¼ of that of the high picture element density in total can be obtained without changing the main scanning speed of the laser beam. At the same time, since the characteristic changing means 60 changes, according to the parameters which determine the picture element density, the position of the scanning lens 21, the control signal to the electric voltage application means 39a, the sampling clock for the D/A convertor 42a, the frequency characteristic of the logarithmic amplifier 16a, and the anti-aliasing filter 35a, a low picture element density image signal can be read out with the amount of energy applied to the stimulable phosphor sheet per one picture element, the sensitivity of the photomultiplier, the shading correction and suppression of aliasing noise set properly according to the read-out picture element density.

Though, in the embodiment described above, the system is set for the high picture element density reading in the initial state, the system may be arranged to be initially set for the standard picture element density reading and to be switched for the high picture element density reading and the low picture element density reading.

When the picture element density in the standard picture element density reading is 10 pix/mm and the main scanning speed (main scanning frequency) is 160 Hz, the sampling intervals in the main scanning direction, the pitches of picture elements in the sub-scanning direction, the sub-scanning speed and the cut-off frequency of the anti-aliasing filter may be, for instance, as follows.

sampling intervals in the main scanning direction: 100 μm pitches of picture elements in the sub-scanning direction: 100 μm sampling cycles in the main scanning direction: 1.0 μsec sub-scanning speed: 16 mm/sec cut-off frequency of the anti-aliasing filter: 500 kHz (Since being an analog filter, the cut-off frequency is preferably not higher than 500 kHz, e.g., 400 kHz)

In the case of high picture element density reading where the picture element density is 20 pix/mm, these factors are changed to as follows with the main scanning speed kept unchanged at 160 Hz.

sampling intervals in the main scanning direction: 50 μm pitches of picture elements in the sub-scanning direction: 50 μm sampling cycles in the main scanning direction: 0.5 μsec sub-scanning speed: 8 mm/sec .

cut-off frequency of the anti-aliasing filter: 1000 kHz

In the case of low picture element density reading where the picture element density is 5 pix/mm, these factors are changed to as follows with the main scanning speed kept unchanged at 160 Hz.

sampling intervals in the main scanning direction: 200 μm pitches of picture elements in the sub-scanning direction: 200 μm sampling cycles in the main scanning direction: 2.0 μsec sub-scanning speed: 32 mm/sec cut-off frequency of the anti-aliasing filter: 250 kHz Though, in the third embodiment, the read-out picture element density is set stepwise like "high picture element density" and "low picture element density", the system may be arranged so that the read-out picture element density can be freely set by selecting the parameters (m, n) which determine the read-out picture element density.

What is claimed is:

1. In a method of reading out a digital image signal at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from the recording medium upon exposure to the light beam to obtain an analog image signal, sampling the analog image signal at a predetermined intervals, and quantizing the sampled values, a method of obtaining a digital image signal at a desired picture element density different from the predetermined picture element density comprising the steps of changing the sub-scanning speed to m(>0) times said predetermined sub-scanning speed, and changing the intervals at which the analog image signal is sampled to intervals n(>0) times said predetermined intervals.

2. A method as defined in claim 1 further comprising a step of carrying out, on the digital image signal, picture element density changing processing for changing the number of the picture elements in the main scanning direction to a/m (a>0) times and the number of the picture elements in the sub-scanning direction to a/n times.

3. A method as defined in claim 1 further comprising a step of changing at least one of the following properties according to the values of said m and n (1) The beam diameter of the light beam, (2) The power of the light beam, (3) The sensitivity of detecting the signal light, (4) The preset data for shading correction when shading correction is to be carried out on the analog image signal, (5) The timing at which the data for shading correction is output from a memory, (6) The frequency transfer properties when the analog image signal is to be logarithmically amplified, (7) The cut-off frequency when filtering for removing aliasing noise is carried out prior to sampling the analog image signal, (8) The parameter for filtering processing in the picture element density changing processing.

4. In a method of obtaining an addition image signal at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from both sides of the recording medium upon exposure to the light beam to obtain two analog image signals, sampling the analog image signals at a predetermined intervals, quantizing the sampled values, and adding two digital image signals thus obtained, a method of obtaining an addition image signal at a desired picture element density different from the predetermined picture element density comprising the steps of changing the sub-scanning speed to m(>0) times said predetermined sub-scanning speed, and changing the intervals at which the analog image signal is sampled to intervals n(>0) times said predetermined intervals, thereby obtaining two intermediate digital image signals, and carrying out, on the intermediate digital image signals, picture element density changing processing for changing the number of the picture elements in the main scanning direction to a/m (a>0) times and the number of the picture elements in the sub-scanning direction to a/n times.

5. A method as defined in claim 4 in which the picture element density changing processing is carried out on said two intermediate digital image signals before they are added together.

6. A method as defined in claim 4 further comprising a step of changing at least one of the following properties according to the values of said m and n (1) The beam diameter of the light beam, (2) The power of the light beam, (3) The sensitivity of detecting the signal light, (4) The preset data for shading correction when shading correction is to be carried out on the analog image signal, (5) The timing at which the data for shading correction is output from a memory, (6) The frequency transfer properties when the analog image signal is to be logarithmically amplified, (7) The cut-off frequency when filtering for removing aliasing noise is carried out prior to sampling the analog image signal, (8) The parameter for filtering processing in the picture element density changing processing.

7. In a method of reading out a digital image signal at a predetermined picture element density by causing a light beam to repeatedly scan a recording medium bearing thereon an image in a main scanning direction at a predetermined main scanning speed while moving the recording medium in a sub-scanning direction substantially perpendicular to the main scanning direction at a predetermined sub-scanning speed, thereby two-dimensionally scanning the recording medium with the light beam, photoelectrically detecting signal light emitted from the recording medium upon exposure to the light beam to obtain an analog image signal, sampling the analog image signal at a predetermined intervals, and quantizing the sampled values, a method of obtaining a digital image signal at a picture element density 1/m×n times the predetermined picture element density comprising the steps of changing the sub-scanning speed to m(>0) times said predetermined sub-scanning speed, changing the intervals at which the analog image signal is sampled to intervals n(>0) times said predetermined intervals, and changing at least one of the following properties according to the values of said m and n, (1) The beam diameter of the light beam, (2) The sensitivity of detecting the signal light, (3) The preset data for shading correction when shading correction is to be carried out on the analog image signal, (4) The frequency transfer properties when the analog image signal is to be logarithmically amplified, (5) The cut-off frequency when filtering for removing aliasing noise is carried out prior to sampling the analog image signal.

8. An image signal read-out system for reading out a digital image signal at a predetermined picture element density comprising a main scanning means which causes a light beam to repeatedly scan a recording medium bearing thereon an image in a main scanning direction at a predetermined main scanning speed, a sub-scanning means which moves the recording medium and/or the light beam relatively to each other in a sub-scanning direction substantially perpendicular to the main scanning direction at a predetermined sub-scanning speed, a photoelectric detector means which photoelectrically detects signal light emitted from the recording medium upon exposure to the light beam to obtain an analog image signal, and an A/D convertor means which samples the analog image signal at a predetermined intervals and quantizes the sampled values, thereby obtaining a digital image signal at a predetermined picture element density, wherein the improvement comprises a sub-scanning speed changing means which causes the sub-scanning means to move the recording medium and/or the light beam relatively to each other in the sub-scanning direction at a speed m(>0) times said predetermined sub-scanning speed, and a sampling interval changing means which causes the A/D convertor means to sample the analog image signal at intervals n(>0) times said predetermined intervals.

9. An image signal read-out system as defined in claim 8 further comprising a picture element density changing processing means which carries out, on the digital image signal output from the A/D convertor means, picture element density changing processing for changing the number of the picture elements in the main scanning direction to a/m (a>0) times and the number of the picture elements in the sub-scanning direction to a/n times.

10. An image signal read-out system as defined in claim 8 further comprising a characteristic changing means which changes at least one of the following properties according to the values of said m and n (1) The beam diameter of the light beam, (2) The power of the light beam, (3) The sensitivity of detecting the signal light, (4) The preset data for shading correction when shading correction is to be carried out on the analog image signal, (5) The timing at which the data for shading correction is output from a memory, (6) The frequency transfer properties when the analog image signal is to be logarithmically amplified, (7) The cut-off frequency when filtering for removing aliasing noise is carried out prior to sampling the analog image signal, (8) The parameter for filtering processing in the picture element density changing processing.

11. An image signal read-out system for obtaining an addition image signal at a predetermined picture element density comprising a main scanning means which causes a light beam to repeatedly scan a recording medium bearing thereon an image in a main scanning direction at a predetermined main scanning speed, a sub-scanning means which moves the recording medium and/or the light beam relatively to each other in a sub-scanning direction substantially perpendicular to the main scanning direction at a predetermined sub-scanning speed, a photoelectric detector means which photoelectrically detects signal light emitted from both sides of the recording medium upon exposure to the light beam to obtain a pair of analog image signals, an A/D convertor means which samples the analog image signals at a predetermined intervals and quantizes the sampled values, thereby obtaining a pair of digital image signals, and an adder means which adds together the digital image signal and obtains an addition image signal at a predetermined picture element density, wherein the improvement comprises a sub-scanning speed changing means which causes the sub-scanning means to move the recording medium and/or the light beam relatively to each other in the sub-scanning direction at a speed m(>0) times said predetermined sub-scanning speed, a sampling interval changing means which causes the A/D convertor means to sample the analog image signal at intervals n(>0) times said predetermined intervals, and picture element density changing processing means which carries out, on the digital image signals output from the A/D convertor means, picture element density changing processing for changing the number of the picture elements in the main scanning direction to a/m (a>0) times and the number of the picture elements in the sub-scanning direction to a/n times.

12. An image signal read-out system as defined in claim 11 in which the picture element density changing processing means carries out said picture element density changing processing on said two digital image signals before they are added together.

13. An image signal read-out system as defined in claim 11 further comprising a characteristic changing means which changes at least one of the following properties according to the values of said m and n:

(1) The beam diameter of the light beam, (2) The power of the light beam, (3) The sensitivity of detecting the signal light, (4) The preset data for shading correction when shading correction is to be carried out on the analog image signal, (5) The timing at which the data for shading correction is output from a memory, (6) The frequency transfer properties when the analog image signal is to be logarithmically amplified, (7) The cut-off frequency when filtering for removing aliasing noise is carried out prior to sampling the analog image signal, (8) The parameter for filtering processing in the picture element density changing processing.

14. An image signal read-out system for reading out a digital image signal at a predetermined picture element density comprising a main scanning means which causes a light beam to repeatedly scan a recording medium bearing thereon an image in a main scanning direction at a predetermined main scanning speed, a sub-scanning means which moves the recording medium and/or the light beam relatively to each other in a sub-scanning direction substantially perpendicular to the main scanning direction at a predetermined sub-scanning speed, a photoelectric detector means which photoelectrically detects signal light emitted from the recording medium upon exposure to the light beam to obtain an analog image signal, and an A/D convertor means which samples the analog image signal at a predetermined intervals and quantizes the sampled values, thereby obtaining a digital image signal at a predetermined picture element density, wherein the improvement comprises picture element density input means which receives values of m (m>0) and n (n>0) which respectively represent that the picture element density in the main scanning direction is to be changed to 1/m times that of the predetermined picture element density and that the picture element density in the sub-scanning direction is to be changed to 1/n times that of the predetermined picture element density, a sub-scanning speed changing means which causes the sub-scanning means to move the recording medium and/or the light beam relatively to each other in the sub-scanning direction at a speed m(>0) times said predetermined sub-scanning speed, a sampling interval changing means which causes the A/D convertor means to sample the analog image signal at intervals n(>0) times said predetermined intervals, and a characteristic changing means which changes at least one of the following properties according to the values of said m and n:

(1) The beam diameter of the light beam (2) The sensitivity of detecting the signal light (3) The preset data for shading correction when shading correction is to be carried out on the analog image signal, (4) The frequency transfer properties when the analog image signal is to be logarithmically amplified, (5) The cut-off frequency when filtering for removing aliasing noise is carried out prior to sampling the analog image signal.

\* \* \* \* \*